United States Patent [19]

Martin

[11] Patent Number: 4,836,586
[45] Date of Patent: Jun. 6, 1989

[54] COMPOSITE COUPLING

[75] Inventor: Charles L. Martin, Palo Alto, Calif.

[73] Assignee: Raychem Corporation, Menlo Park, Calif.

[21] Appl. No.: 113,321

[22] Filed: Oct. 20, 1987

Related U.S. Application Data

[63] Continuation of Ser. No. 572,838, Jan. 23, 1984, abandoned, which is a continuation of Ser. No. 118,867, Feb. 6, 1980, Pat. No. 4,469,357, which is a continuation of Ser. No. 608,209, Aug. 27, 1975, abandoned, which is a continuation-in-part of Ser. No. 404,723, Oct. 9, 1973, abandoned, and a continuation-in-part of Ser. No. 404,724, Oct. 9, 1973, abandoned.

[30] Foreign Application Priority Data

Apr. 9, 1975 [SE] Sweden ................................ 7504071

[51] Int. Cl.$^4$ .............................................. F16L 25/00
[52] U.S. Cl. .................................. 285/381; 285/382.7; 285/417; 285/906
[58] Field of Search .................. 285/381, 382.2, 382.7, 285/382, 382.1, 369, 417, 328, 422, 373, 419, 256; 403/273, 264, 278, 265, 261; 29/447, 521, 508, 526, 516

[56] References Cited

U.S. PATENT DOCUMENTS

| 351,263 | 10/1986 | Hemphill | 285/381 |
|---|---|---|---|
| 1,186,812 | 6/1916 | McFerran | 285/382.2 |
| 1,186,813 | 6/1916 | McFerran | 285/382.2 X |
| 1,265,706 | 5/1918 | Burdeen | . |
| 1,721,197 | 7/1929 | Almen | 29/447 |
| 1,910,269 | 5/1933 | Sunderlang | 403/284 |
| 2,080,220 | 5/1937 | Butter et al. | 85/37 |
| 2,273,398 | 2/1942 | Couty | . |
| 2,378,525 | 6/1945 | Abegg | 29/447 X |
| 2,458,152 | 1/1949 | Eakins | 18/59 |
| 2,575,213 | 11/1951 | Fruth | 85/40 |
| 2,575,481 | 11/1951 | Anderson | 403/285 |

(List continued on next page.)

FOREIGN PATENT DOCUMENTS

| 404335 | 1/1967 | Australia . | |
|---|---|---|---|
| 680637 | 2/1964 | Canada | 403/278 |
| 845495 | 6/1966 | Canada . | |
| 865082 | 1/1953 | Fed. Rep. of Germany | 285/421 |
| 932706 | 9/1954 | Fed. Rep. of Germany . | |
| 1024449 | 7/1956 | Fed. Rep. of Germany . | |
| 1400873 | 7/1961 | Fed. Rep. of Germany . | |
| 1479670 | 1/1964 | Fed. Rep. of Germany . | |
| 1525815 | 11/1965 | Fed. Rep. of Germany . | |
| 1511648 | 12/1966 | Fed. Rep. of Germany . | |
| 1627727 | 7/1967 | Fed. Rep. of Germany . | |
| 2003948 | 1/1969 | Fed. Rep. of Germany . | |
| 2008021 | 3/1969 | Fed. Rep. of Germany . | |
| 2020859 | 3/1969 | Fed. Rep. of Germany . | |
| 2041807 | 8/1969 | Fed. Rep. of Germany . | |

(List continued on next page.)

Primary Examiner—Dave W. Arola
Attorney, Agent, or Firm—Sheldon & Mak

[57] ABSTRACT

Described herein are composite devices comprising two members. The first member is a heat recoverable driving member and the second is a metallic member associated with the first in such a way that upon heat recovery of the driver, the second member is dimensionally altered to engage a substrate. In one embodiment, useful for example as a composite coupling for joining cylindrical substrates, the driver comprises a tubular heat recoverable compression sleeve having a generally uniform interior surface. In this embodiment, the second member comprises a tubular insert snugly, and concentrically disposed within the sleeve. Although both its interior and exterior surfaces may be uniform, preferably one or both surfaces has a weakened portion to facilitate its deformation or bears integral radial teeth or a combination thereof. Upon heat recovery of the compression sleeve, the insert is compressed about the substrate.

In another embodiment, the driver is positioned internally of the second member. Expansive heat recovery of the driver expands the second member to engage the substrate.

In other embodiments, one or more members of the device can be made from a gall-prone metal to facilitate engagement of the device to a substrate or to facilitate engagement between members of the device.

69 Claims, 13 Drawing Sheets

U.S. PATENT DOCUMENTS

| | | | |
|---|---|---|---|
| 2,668,468 | 2/1954 | Flegaus | 85/40 |
| 2,787,481 | 4/1957 | Buschow | 285/329 |
| 2,797,111 | 6/1957 | Beazley | 285/256 X |
| 2,994,933 | 8/1961 | Wolfe | 24/141 |
| 3,033,600 | 5/1962 | Drysdale . | |
| 3,033,727 | 5/1982 | Cram et al. . | |
| 3,113,408 | 12/1963 | Kirkpatrick et al. | 53/30 |
| 3,139,468 | 6/1964 | Wheat | 264/230 |
| 3,140,108 | 7/1964 | Klein et al. | 287/119 |
| 3,143,012 | 8/1964 | Deperthes | 29/447 X |
| 3,149,861 | 9/1964 | Larsson . | |
| 3,184,535 | 5/1965 | Worthington . | |
| 3,235,284 | 2/1966 | Jones . | |
| 3,235,289 | 2/1966 | Jones | 285/423 X |
| 3,245,699 | 4/1966 | Peterson . | |
| 3,317,655 | 5/1987 | Oatess et al. . | |
| 3,320,355 | 5/1967 | Booker | 285/381 |
| 3,376,060 | 4/1968 | Tomioka | 287/108 |
| 3,425,719 | 2/1969 | Bardon . | |
| 3,513,429 | 5/1970 | Helsop | 285/381 |
| 3,531,146 | 8/1970 | Blad et al. . | |
| 3,558,369 | 1/1971 | Wang et al. | 148/11.5 |
| 3,567,523 | 3/1971 | Jackson et al. | 148/11.5 |
| 3,579,805 | 5/1971 | Kast | 285/381 |
| 3,588,150 | 6/1971 | Wald | 285/381 |
| 3,601,783 | 8/1971 | Loose . | |
| 3,632,141 | 1/1972 | Larsson | 285/382.7 X |
| 3,675,949 | 7/1972 | Dawson | 285/382.2 |
| 3,740,839 | 6/1973 | Otte | 29/447 X |
| 3,786,552 | 1/1974 | Saito | 29/447 X |
| 3,805,557 | 4/1974 | Sinerco | 285/381 X |
| 3,805,567 | 4/1974 | Sinerco | 285/381 X |
| 3,819,149 | 6/1974 | Kinder | 285/381 |
| 3,832,243 | 8/1974 | Donkerslout et al. | 148/32 |
| 3,848,389 | 11/1974 | Gapp | 52/758 D |
| 3,913,444 | 10/1975 | Otte | 29/447 |
| 4,035,007 | 7/1977 | Harrison . | |
| 4,328,982 | 5/1982 | Christianson | 285/351 |

FOREIGN PATENT DOCUMENTS

| | | | |
|---|---|---|---|
| 1945362 | 3/1970 | Fed. Rep. of Germany . | |
| 2231922 | 6/1971 | Fed. Rep. of Germany . | |
| 2355901 | 11/1972 | Fed. Rep. of Germany . | |
| 2003173 | 3/1973 | Fed. Rep. of Germany . | |
| 1529286 | 6/1966 | France . | |
| 1469479 | 1/1967 | France . | |
| 2059202 | 5/1971 | France . | |
| 7211748 | 11/1972 | France . | |
| 7339658 | 11/1973 | France . | |
| 2205638 | 5/1974 | France . | |
| 35091 | 6/1973 | Israel . | |
| 41599 | 6/1973 | Israel . | |
| 43519 | 6/1973 | Israel . | |
| 64125 | 3/1973 | Japan . | |
| 474406 | 6/1969 | Switzerland . | |
| 589415 | 6/1947 | United Kingdom | 285/382.7 |
| 825766 | 12/1959 | United Kingdom | 285/382 |
| 1062870 | 7/1962 | United Kingdom . | |
| 979833 | 7/1963 | United Kingdom . | |
| 1116879 | 8/1964 | United Kingdom . | |
| 1155470 | 11/1965 | United Kingdom . | |
| 1203276 | 11/1966 | United Kingdom . | |
| 1212093 | 6/1967 | United Kingdom . | |
| 1237876 | 10/1967 | United Kingdom . | |
| 1288504 | 3/1969 | United Kingdom . | |
| 1231352 | 5/1969 | United Kingdom . | |
| 1327441 | 8/1969 | United Kingdom . | |
| 1327442 | 8/1969 | United Kingdom . | |
| 1373100 | 11/1970 | United Kingdom . | |
| 1392212 | 4/1975 | United Kingdom . | |

OTHER PUBLICATIONS

"Gas Supply Line Rehabilitation-10 Years of Natural Gas Supply"-Dipl-Ing. R. Dickmann, Bieiefeld, Pub. 6/76.

"Experience with Liquid Nitrogen in Shrinking", Quirin Berndt, REFA Eng., Villigst/Schwerte, 1969.

ASTM Standards A106 and A450.

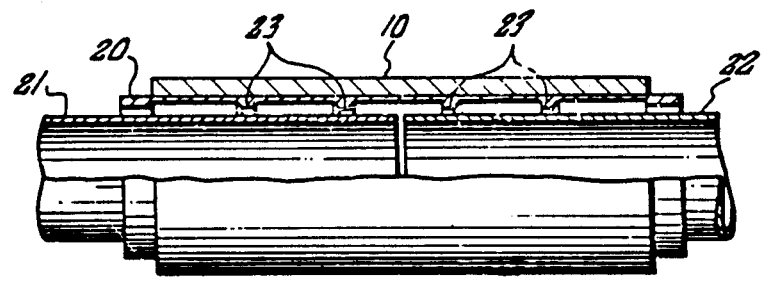
FIG_2a_
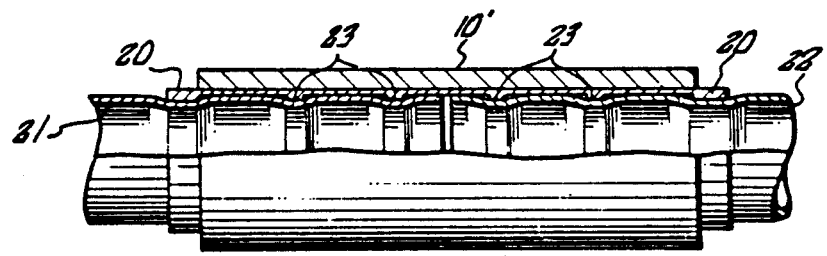
FIG_2b_
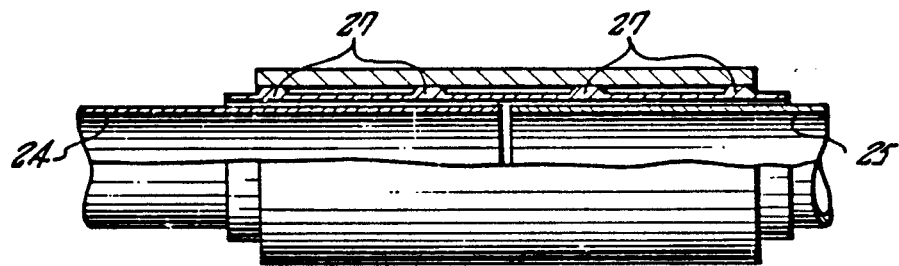
FIG_3a_
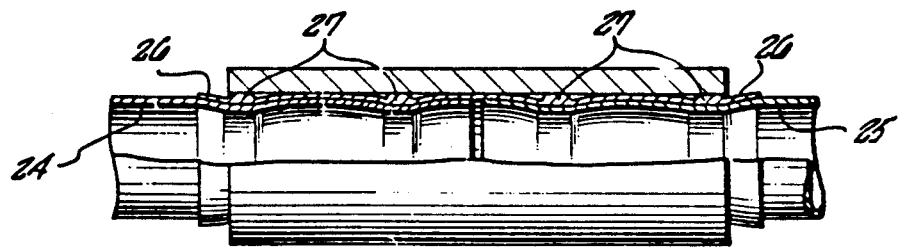
FIG_3b_

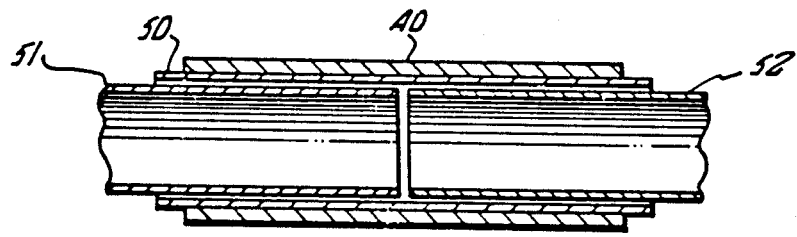
FIG_6a_
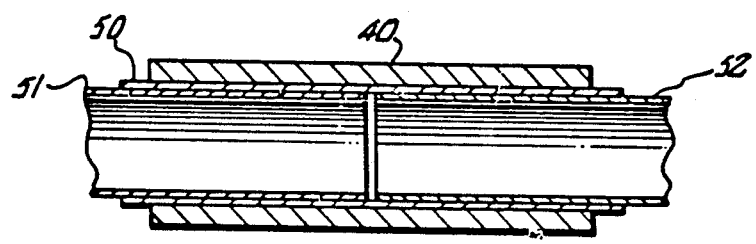
FIG_6b_
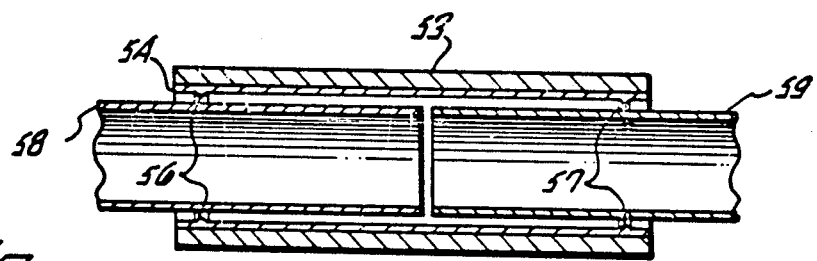
FIG_7a_
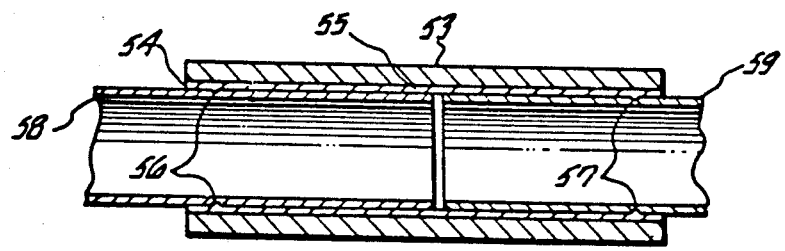
FIG_7b_

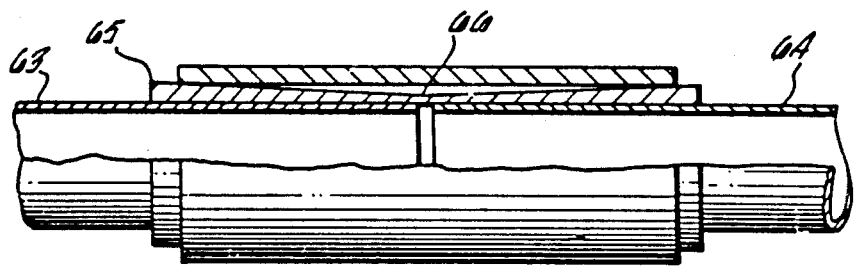
FIG_8a_
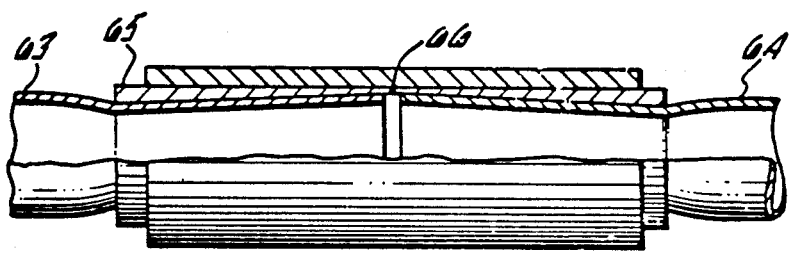
FIG_8b_
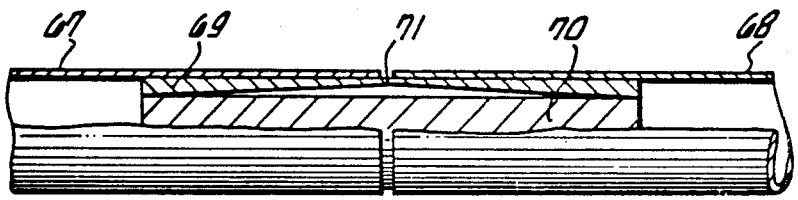
FIG_9a_
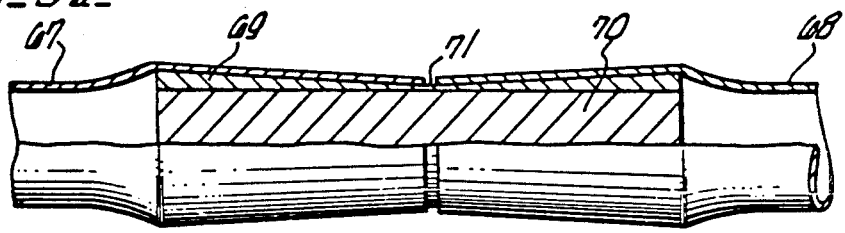
FIG_9b_
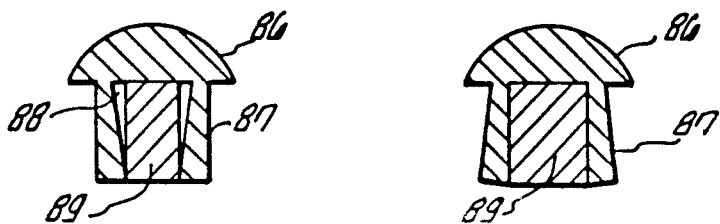
FIG_14a_    FIG_14b_

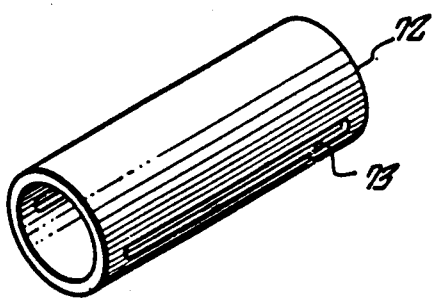
FIG_10_
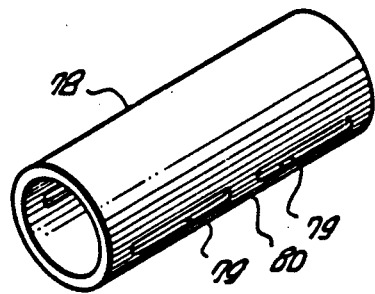
FIG_12_
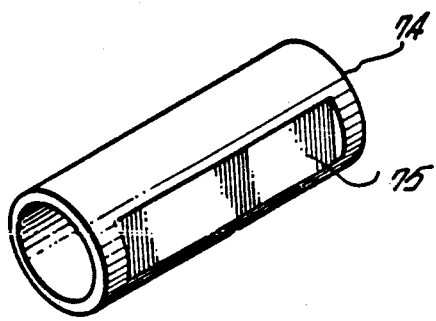
FIG_11a_
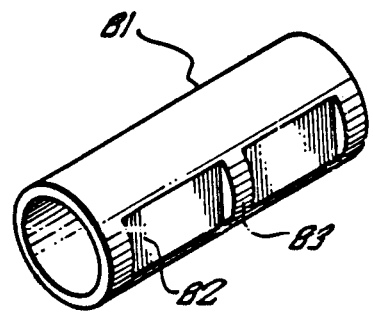
FIG_13a_
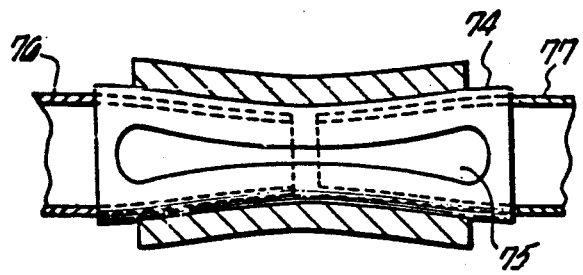
FIG_11b_
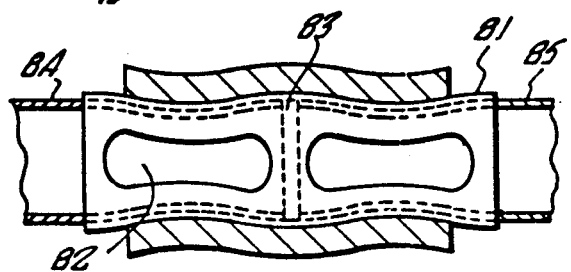
FIG_13b_

FIG_15a
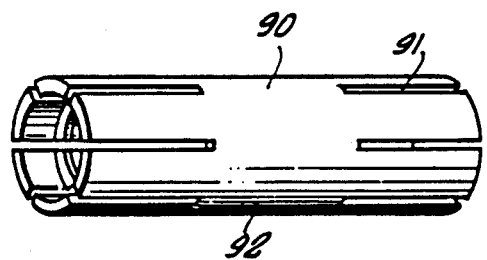
FIG_15b
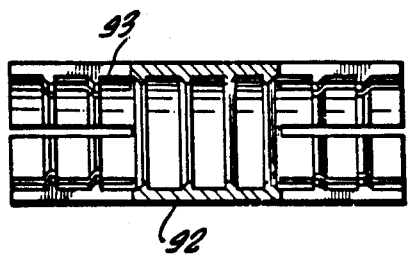
FIG_16
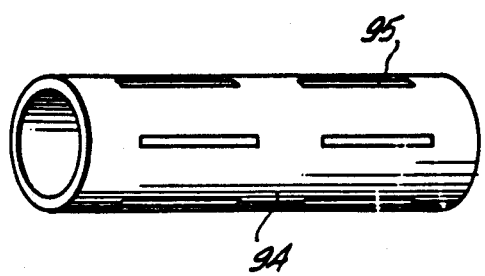
FIG_17a
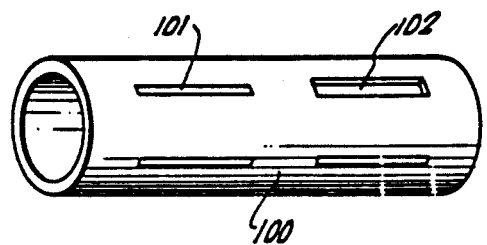
FIG_17b
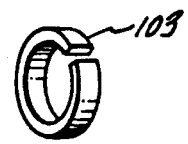
FIG_17c
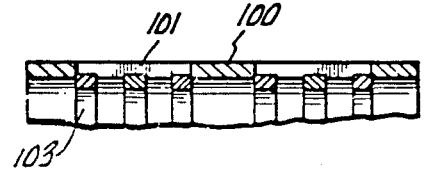

FIG_18a_ 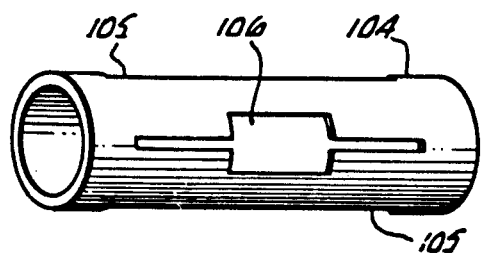
FIG_18c_  FIG_18b_ 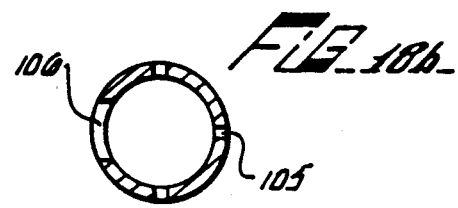
FIG_18d_ 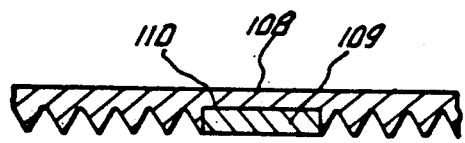
FIG_18e_ 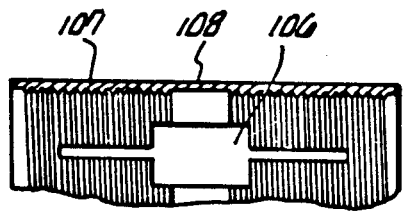
FIG_19_ 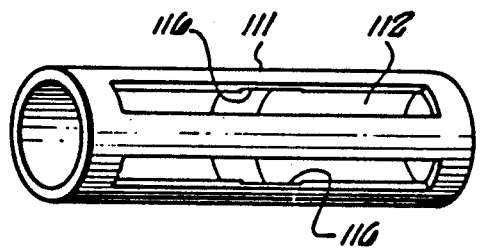
FIG_20_ 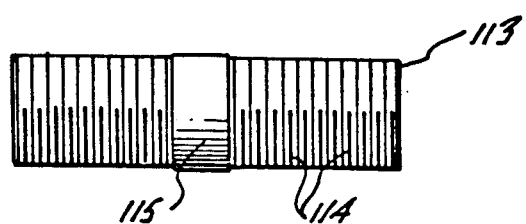

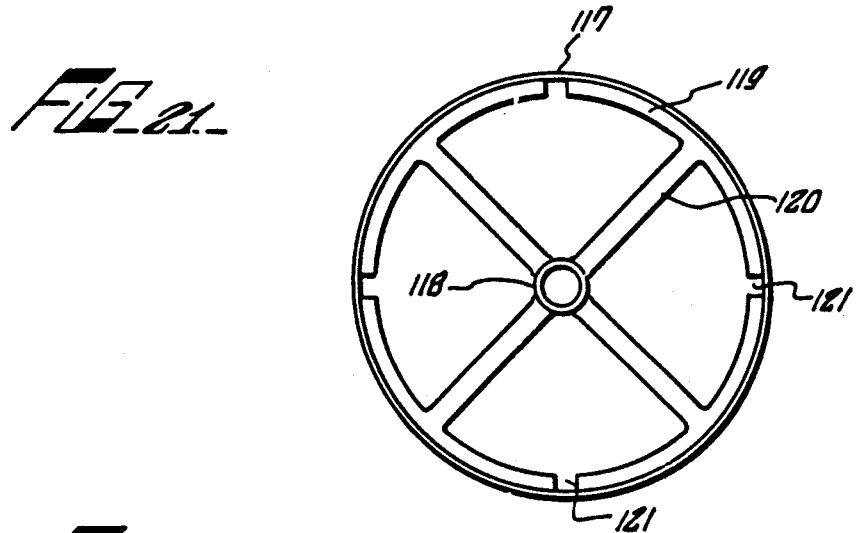
FIG_21_
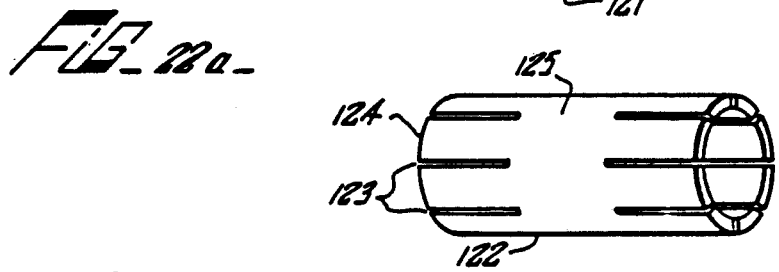
FIG_22a_
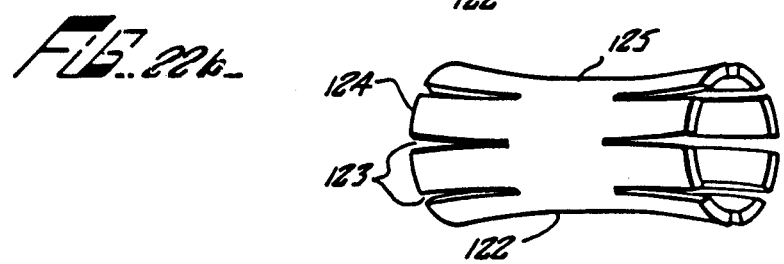
FIG_22b_
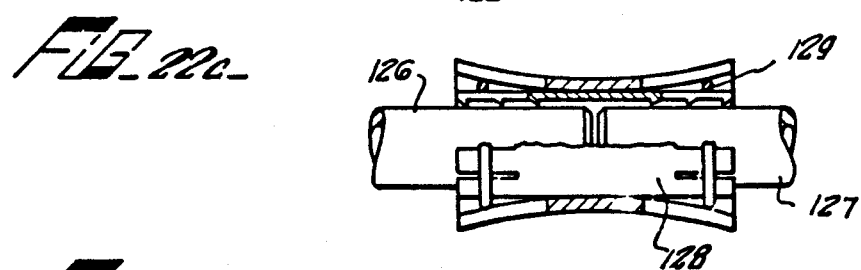
FIG_22c_
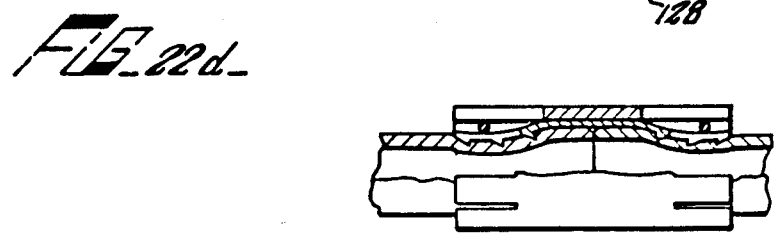
FIG_22d_

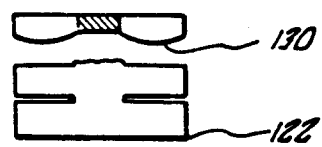
FIG._22e_
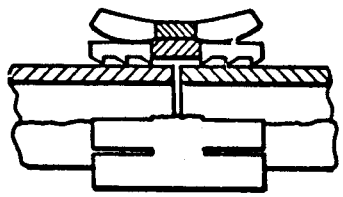
FIG._22f_
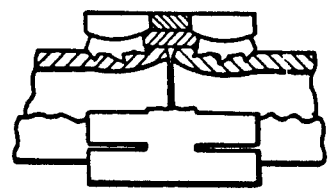
FIG._22g_
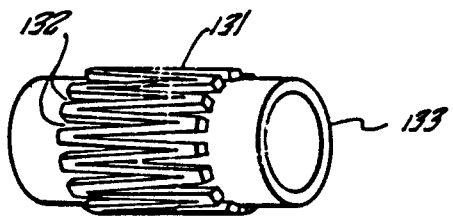
FIG._23_
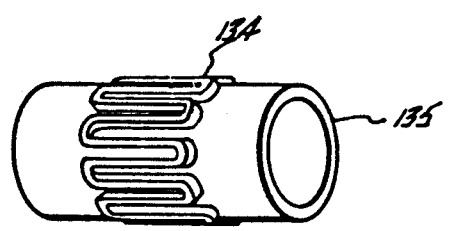
FIG._24a_
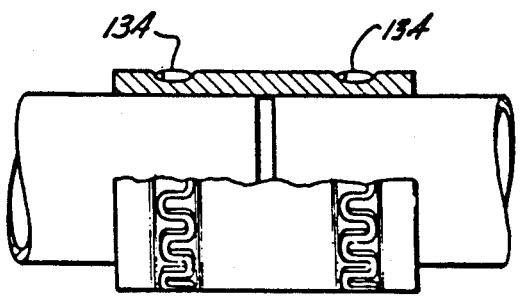
FIG._24b_

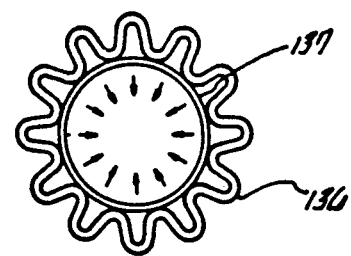
FIG_25a_
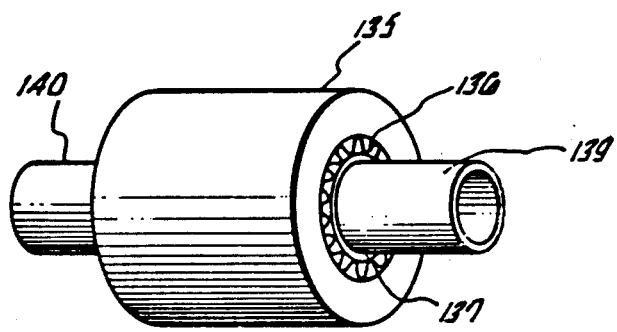
FIG_25b_
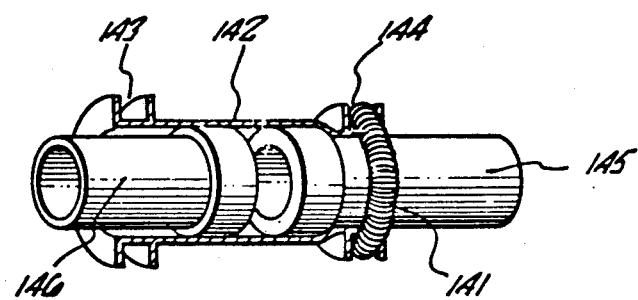
FIG_26_

COMPOSITE COUPLING

RELATED APPLICATIONS

This application is continuation of application Ser. No. 572,838, filed Jan. 23, 1984 which is a continuation of application Ser. No. 118,867 filed Feb. 6, 1980, now U.S. Pat. No. 4,469,357, which is a continuation of application Ser. No. 608,209, filed Aug. 27, 1975, which is a continuation-in-part of my copending application Ser. No. 404,723 filed Oct. 9, 1973 entitled "Composite Coupling" and a continuation-in-part of my copending application Ser. No. 404,724 filed Oct. 9, 1973, both now abandoned the disclosures of which are incorporated by reference.

FIELD OF THE INVENTION

This invention relates to heat recoverable devices. More specifically, it relates to a heat recoverable composite device for joining tubular substrates.

BACKGROUND OF THE INVENTION

Heat recoverable articles, i.e. those which have been deformed from a first heat-stable configuration to a second heat-unstable configuration and which are capable of returning, or recovering, towards said first configuration upon the application of heat alone, have found many applications in diverse fields. Such articles have typically been made from polymeric materials, especially cross-linked polymers, and have been described, for example, in U.S. Pat. Nos. 2,027,962 (Currie) and 3,086,242 (Cook et al).

Quite recently, it has been discovered that such articles can be made from certain metals, sometimes called "memory metals" or "memory alloys". These metal exhibit changes in strength and configurational characteristics on passing through a transistion temperature, in most cases the transition temperature between the martensitic and austenitic states, and can be used to make heat recoverable articles by deforming an article made from them whilst the metal is in its martensitic, low temperature, state. The article will retain its deformed configuration until it is warmed above the transition temperature to the austenitic state when it will recover towards its original confiuration. The deformation used to place the material in the heat-unstable configuration is commonly referred to as thermally recoverable plastic deformation and can also, in certain cases, be imparted by introducing strains into the article above the transition temperature, whereupon the article assumes the deformed configuration on cooling through the transition temperature. It should be understood that the transition temperature may be a temperature range and that, as hysteresis usually occurs, the precise temperature at which transition occurs may depend on whether the temperature is rising or falling. Furthermore, the transition temperature is a function of other parameters, including the stress applied to the material, the temperature rising with increasing stress.

Amongst such memory metals there may especially be mentioned various alloys of titanium and nickel which are described, for example, in U.S. Pat. Nos. 3,174,851, 3,351,463, 3,753,700, 3,759,552, British Pat. Nos. 1,327,441 and 1,327,442 and NASA Publication SP 5110, "55-Nitinol-The Alloy with a Memory, etc." (U.S. Government Printing Office, Washington, D.C. 1972), the disclosures of which are incorporated herein by reference. The property of heat recoverability has not, however, been solely confined to such titanium-nickel alloys. Thus, for example, various beta-brass alloys have been demonstrated to exhibit this property in, e.g., N. Nakanishi et al, *Scripta Metallurgica* 5, 433–440 (Pergamon Press 1971) and such materials may be doped to lower their transition temperatures to cryogenic regimes by known techniques. Similarly, 304 stainless steels have been shown to enjoy such characteristics, E. Enami et al, id at pp. 663–68. These disclosures are similarly incorporated herein by reference.

British Patent Specifications Nos. 1,327,441 and 1,327,442 describe how this property of heat recoverability can be used to fabricate compression sleeves (i.e. tubular articles in which the forces of heat recovery are directed radially inwardly) useful in joining cylindrical substrates such as hydraulic lines and other conduitry employed in aerospace applications. In the fabrication of these and other such recoverable couplings, the couplings are cooled below their transition temperature, for example by immersion in liquid nitrogen, and are diametrally expanded by forcing a mandrel through them, the mandrel tapering outwardly to a transverse dimension greater than the original internal diameter of the coupling.

In monolithic heat recoverable metallic couplings of this type, the interior surface of the coupling is machined prior to diametral expansion in order to provide circumferential teeth which "bite" into or otherwise deform the surface of a substrate about which the coupling is subsequently heat recovered, enhancing the ability of the resulting article to resist tensile stress and, in particular instances, to achieve a gas-tight interface between coupling and substrate (as used herein, the term "gas-tight" signifies the ability of a coupling-substrate interface as is found in a pipe joint to pass not more than one bubble per minute over a five minute period when an article pressurized with nitrogen at 3000 psig is immersed in water).

Various problems arise from the provision of such teeth on the interior surface of monolithic heat recoverable metallic couplings. First of all, the teeth are subjected to enormous local pressures during mandrel expansion, with consequent damage to the teeth frequently sufficiently severe as (a) to impair the ability of the coupling to form a gas-tight joint, (b) to reduce the tensile strength of the joint and (c) to lower the amount of pressure the joint is capable of withstanding. Secondly, many metallic materials susceptible to the impartaton of heat recoverability are difficult to machine.

Other problems have arisen from the monolithic nature of couplings heretofore employed. For one, such couplings tend to recover prematurely when placed over a warm substrate, requiring the use of special chilling tools to abate recovery prior to proper positioning of the coupling on the substrate. Furthermore, rigid quality control procedures have been required to ensure that, prior to application, any lubricant deposited on the interior surface of the coupling to aid mandrel expansion has been removed. Finally, the somewhat limited range of materials susceptible to the impartation of heat recoverability has, in certain instances, prevented the optimum pairing of compression sleeve and substrate materials from mechanical, chemical and electrical standpoints such, for example, as corrosion compatibility, thermal expansion properties, creep resistance, sealability, compatibility of elastic modulus and high temperature strength.

SUMMARY OF THE INVENTION

The present invention provides a device comprising a first, heat shrinkable or heat expansible member made from a memory metal and a second, sleeve member positioned respectively inside or outside said first member, said second sleeve member having such configuration that, and/or being made from such a material that it facilitates the formation of a secure coupling between the device and a substrate.

The present invention also provides a set of parts for making a device as described above which comprises a heat shrinkable or heat expansible member made from a memory metal and a sleeve member adapted to be positioned respectively inside or outside the memory metal member.

BRIEF DESCRIPTION OF THE DRAWINGS

FIG. 2a shows, in cross-section, a heat recoverable coupling device formed in the manner shown in FIG. 1 and positioned about the aligned ends of two pipes;

FIG. 2b shows the coupling device of FIG. 2a after recovery;

FIG. 3a shows, in cross-section, a second form of coupling device according to the present invention positioned about the aligned ends of two pipes;

FIG. 3b shows the coupling device of FIG. 3a after recovery;

FIG. 6a shows the coupling device formed in the manner shown in FIG. 5 positioned about the aligned ends of two pipes;

FIG. 6b shws the coupling device of FIG. 6a after recovery;

FIG. 7a shows a further form of heat recoverable coupling according to the present invention positioned about the aligned ends of two pipes;

FIG. 7b shows the coupling device of FIG. 7a after recovery;

FIG. 8a shows a further form of device according to the present invention positioned about the aligned ends of two pipes;

FIG. 8b shows the device of FIG. 8a after recovery;

FIG. 9a shows a heat expansible device according to the present invention positioned within the aligned ends of two pipes;

FIG. 9b shows the device of FIG. 9a after recovery;

FIG. 10 shows an insert sleeve suitable for use in the present invention;

FIG. 11a shows a further form of insert sleeve suitable for use in the present invention;

FIG. 11b shows, in cross-section, a device according to the present invention employing the insert sleeve of FIG. 11a after recovery about the aligned end of two pipes;

FIG. 12 shows a further form of insert sleeve suitable for use in the present invention;

FIG. 13a shows a further for of insert sleeve according to the present invention;

FIG. 13b show, in cross-section, a device according to the present invention employing the insert sleeve of FIG. 13a;

FIG. 14a shows a further heat expansible device in the form of a rivet;

FIG. 14b shows the rivet of FIG. 14a after recovery;

FIG. 15a shows a further form of insert sleeve suitable for use in the present invention;

FIG. 15b is a longitudinal cross-section through FIG. 15a;

FIG. 16 shows a further form of insert sleeve for use in the present invention;

FIG. 17a shows a further form of insert sleeve for use in the present invention;

FIG. 17b shows an auxiliary insert member for use with the sleeve of 17a;

FIG. 17c is a longitudinal section through FIG. 17b;

FIG. 18a shows a further form of insert sleeve for use in the present invention;

FIG. 18b is a cross-section through the mid-section of FIG. 18a;

FIG. 18c shows an auxiliary insert ring for use with the sleeve of FIG. 18a;

FIG. 18d is a partical section showing the sleeve of FIG. 18a and the ring of FIG. 18c;

FIG. 18e is a longitudial section through FIG. 18a;

FIG. 19 shows a further insert sleeve for use in the present invention;

FIG. 20 shows an auxiliary insert member for use with the sleeve fo FIG. 19;

FIG. 21 illustrates a composite coupling device having a driver of large diameter;

FIGS. 22a-22g illustrate a composite coupling having a slit driver;

FIG. 23 illustrates a coupling wherein the driver has "z" shaped bends;

FIGS. 24a-24b illustrates another coupling device in which the driver has "s" shaped convolutions;

FIGS. 25a-25b illustrate another coupling device having a convoluted driver; and FIG. 26 illustrates a composite coupling of yet another type in which the driver is a spring-like member.

DETAILED DESCRIPTION OF THE INVENTION

Figure 1:
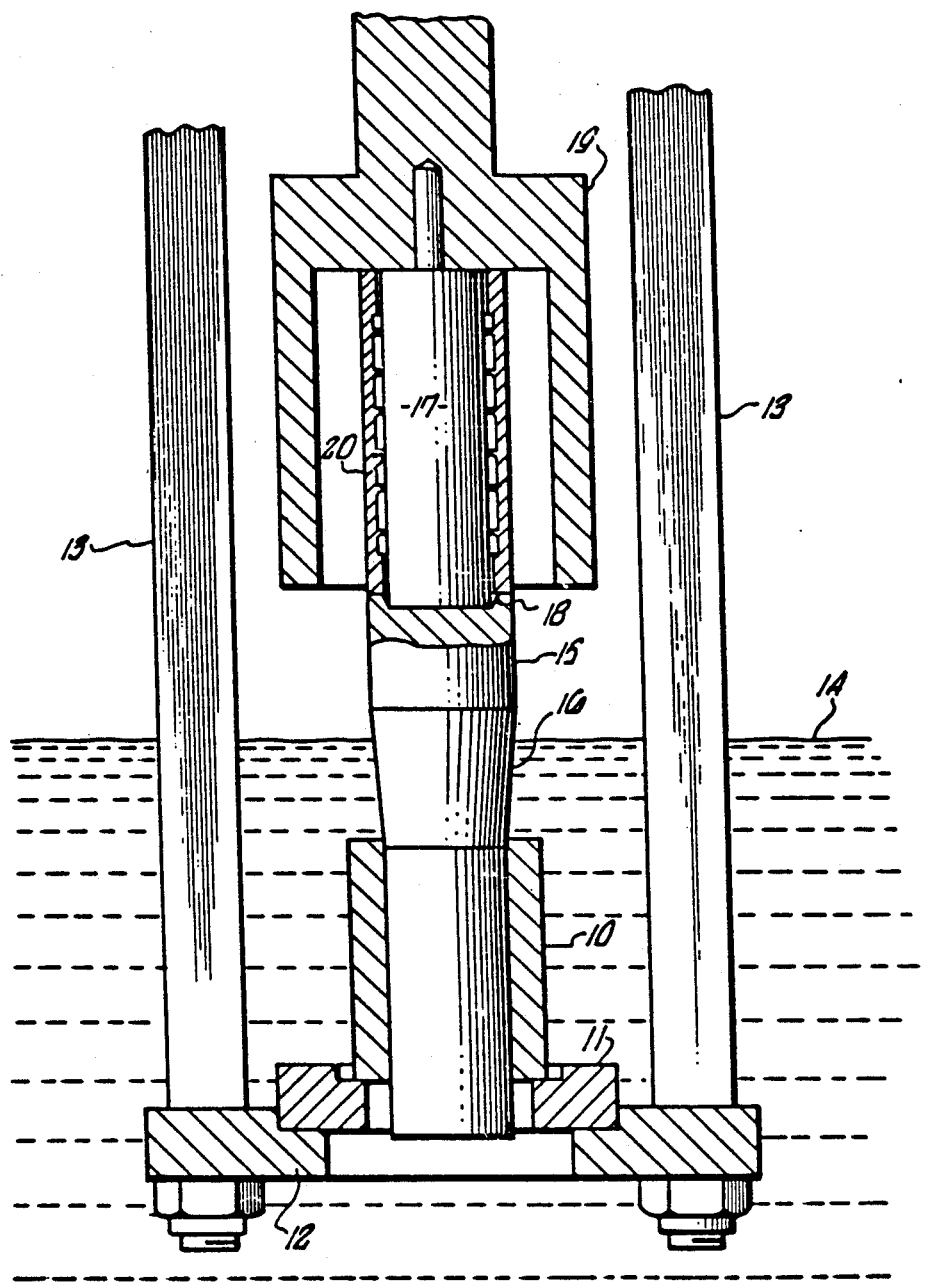
FIG. 1 is a view, partly in section, showing one manner of making a coupling device according to the present invention having an insert provided with a plurality of teeth.

The present invention is especially applicable to hollow, heat shrinkable members made from a memory metal, especially tubular members. The word "tubular" as used herein is not limited to right cylindrical hollow members, but also includes members of irregular and/or of varying cross-section as well as, for example, Y-shaped, T-shaped and X-shaped members. An especially preferred member is a tubular heat shrinkable compression coupling sleeve.

In such devices the second sleeve member is an insert member which is preferably snugly positioned within the heat shrinkable memory metal member, for example a tubular insert snugly positioned within a tubular compression coupling sleeve and coaxially, e.g. concentrically, arranged therein.

However, in other useful devices according to the present invention the memory metal member is heat expansible, e.g. is a rod or tube, in which case the second sleeve member is preferably snugly positioned about said memory metal member. Such devices may be used, for example, in the internal coupling of pipe lines.

The sleeve member may be formed as an integral part, for example as a tube, but the present invention is not limited to such parts, for example split cylinders, (the word "cylinder" being used in the general sense and not being limited to a circular cross-section) and other shaped parts may in some cases be used to advantage. It will be appreciated from the discussion hereinafter that all that is necessary is that the sleeve member covers at least a substantial part of the surface of the memory metal member which would otherwise come into direct contact with a substrate during coupling.

The sleeve member is preferably sized and configured so that it is alerted in at least one of its dimensions upon recovery of the heat recoverable member and so that the change in its dimension(s) causes it securely to engage a substrate.

In one preferred embodimentof the present invention the sleeve member is provided on at least one of its principal surfaces with means for effecting a secure, and preferably gas-tight, seal between the device and a substrate upon recovery of the device. Such means preferably comprises at least one tooth on said principal surface. Referring to the preferred tubular forms of the device the tooth is preferably radially disposed and is more preferably formed circumferentially about the longitudinal axis of said sleeve. Advantageously the sleeve is provided with a plurality of teeth on each side of its mid-point.

However, alternative means may be employed to provide a good seal, for example the sleeve may be provided with a ring of a deformable material such as annealed aluminium or copper or may be coated with, for example, a fluorocarbon or another polymeric material or may be plated with a readily deformable metal.

The sleeve can advantageously be provided with such means on each of its principal surfaces to ensure good contact both between itself and the heat recoverable metal member and between the coupling device and a substrate, for example each of its principal surfaces may be provided with one or more teeth and, preferably, each is provided with a plurality of teeth on each side of its mid-point. Advantageously such teeth may be arranged in pairs, one member of which is formed externally of the sleeve and the other of which is formed internally of the sleeve. Of course the number, shape and location of the teeth will vary depending upon the materials from which the teeth and the substrate are formed and upon the type of engagement which is desired between them.

In another preferred embodiment of the present invention the sleeve has at least one weakened wall section, preferably at least a pair of weakened wall sections. For example, the weakened sections may be slots in the wall or may be "flats", i.e. areas on the surface of the insert sleeve where the wall thickness has been locally reduced, preferably slots and flats are disposed parallel to the axis of the insert sleeve and pairs of slots or flats are preferably arranged symmetrically so that relatively uniform deformation of the insert about its circumference occurs upon its recovery. Preferably the slots and flats are equidistant from the ends of the insert sleeve and it is advantageous to provide at least two pairs of slots of flats on either side of, and equidistant from, a non-weakened mid-section. The flats are preferably formed on the exterior surface of an insert sleeve.

In another preferred form of weakened insert sleeve the outside surface thereof tapes from a maximum wall thickness at points adjacent to either end to a minimum at about its mid-section, the internal surface of the insert sleeve being preferably uniform.

In all the above cases it may be preferable to provide the surfacesof the insert sleeve, especially the interior surface, with a plurality of teeth, as described above, preferably on either side of its mid-section. Alternatively, or additionally, it may also be preferable to form the insert sleeve from a gall-prone material as described below.

In another preferred embodiment of the present invention the sleeve is fabricated from a gall-prone material, e.g., a metal. "Galling" has reference to that condition arising from the affinity of gall-prone metals, one from the other, which occasions seizure at the rubbing surfaces of articles formed from those metals over and above normal frictional effects, as by localized welding, followed by subsequent spalling and the creation of increased surface asperity. Cf. *Metals Handbook* Vol. 1, p. 18, American Society for Metals, 8th ed. (1961). (As used herein, the term "metal" unless otherwise qualified includes both pure and alloyed metals). Gall-prone metals may gall one another and may gall other metals similar in hardness, surface characteristics and chemical make-up as well. Especially gall-prone metals include titanium, aluminium, magnesium and zirconium, and the inserts of the invention may be formed of such metals. A preferred insert is formed of commercially pure titanium, e.g. titanium 50A. One suitable titanium alloy is that designated Ti-3Al-2.5 V, a titanium-aluminum-vanadium alloy. Preferred aluminium inserts are forme of the 6061 aluminium series, preferably 6061 T6 aluminium. Those alloys comprise about 1% magnesium, 0.06% silicon, 0.25% copper and 0.25% chromium, the balance being aluminium. Other suitable materials for the insert include commercially pure zirconium, Zircalloy 2 (containing about 1.5% tin, 0.12% iron, 0.1% Chromium, 0.005% nickel, the balance being zirconium), an alloy available from Zirconium Tech, Corp., Albany, Oreg.; and magnesium alloys available from, e.g. Dow Chemical Corporation under the designations AZ 31 B-F (containing about 2.5–3.5% aluminium, 0.7–1.3% zinc, 0.2% manganese minimum, the balance being magnesium) and ZK 60 A-T5 (containing about 4.8–6.2% zinc, 0.45% zirconium, the balance being magnesium).

For example, in some cases, the sleeve may be a simple tubular sleeve formed from a gall-prone metal, and no other means need be provided for ensuring a good seal either between the sleeve and the heat recoverable member or between the sleeve and a substrate. When other means are provided on the sleeve (such as those described above) for effecting a good seal, but said means are provided only on one principal surface of the sleeve, it will again be advantageous in many cases to form the sleeve from a gall-prone material. In short, when the contacting surfaces at either the interface between the sleeve and a substrate are both substantially uniform it will be advantageous to form the sleeve from a gall-prone material. It will be appreciated that, for optimal attainment of the advantages conferred by the use of gall-prone materials the surface roughness of the sleeve will desirably be similar to that of one or more of the surfaces it contacts in any particular application.

For example, for the hydraulic conduitry for which the devices are employed the generally uniform surface of the sleeve will advantageously exhibit a profilometer roughness of not more than about 125 micro-inches, preferably not more than 63 micro-inches.

It should be appreciated from the above discussions that the dimensions, configuration and material of the sleeve member will be chosen for effective performance having regard to the nature of the heat-recoverable metal member, the substrate and the environment in which the device of the present invention is to be used. Thus whilst the above discussion has especially been directed to the provision of teeth on the insert, to the provision of weakened sections in the insert and to the formation of the insert from gall-prone materials, it must be made clear that a given insert may combine any two or all three of these features and indeed may include further design aspects and/or materials which will ameliorate its performance in any given application.

For example, the sleeve may be provided with a coating of a polymer material or a deformable metal, as described above, e.g. to facilitate the formation of a gas-tight seal on recovery. Furthermore, the insert may be provided with teeth and/or weakened portions only in certain parts of its structure.

In certain embodiments of the present invention the sleeve is itself provided with an insert or external auxiliary member, or both to enhance its overall performance. Particular instances in which this may be advantageous is when the compatibility requirements between the sleeve and the heat recoverable metal member differ from those between the sleeve and the substrate or when, as for example in the formation of a fluid proof coupling between two hydraulic pipe substrates, the various parts of the sleeve may be required to fulfil two different functions, e.g. proper mechanical coupling with the pipes and the formation of a corrosion-resistant seal at the junction between the pipes.

Thus, for example, it may be appropriate to provide the mid-section of an insert sleeve having hard teeth on its interior surface with a separate sealing ring insert at its mid-section to provide a satisfactory, e.g. corrosion-resistant and gas-tight, seal. Conversely, it may be appropriate to provide an insert sleeve having a generally smooth corrosion resistant surface with one or more toothed insert members positioned away from its midpoint. Equally it may in some cases prove advantageous to provide an insert sleeve having overall compatibility with the heat recoverable metal member with inserts both for corrosion-proof sealing purposes and for proper mechanical coupling with the substrate(s). (It will be appreciated that there concepts apply also to exterior sleeve members and also to compatibility with, and satisfactory mechanical coupling to, the heat recoverable metal member).

The sleeve member may be provided with grooves or other recessed or otherwise shaped portions for the proper positioning of these further auxiliary insert (or external) members. Furthermore, the sleeve and/or the auxiliary insert members may be made resilient to facilitate secure positioning.

When an insert sleeve is to be provided with such further auxiliary insert members it may be advantageous to provide it with slots, or to form it as a longitudinally split sleeve, so that said further auxiliary insert members can be inserted through said slots or through the slit to place them in position. However, this will not be essential in all cases, for example, it may be possible to push the auxiliary insert members into the sleeve from one of the ends thereof.

It should also be appreciated that, whilst the present invention is especially directed to avoiding the disadvantages present in some cases when the heat recoverable metal member is provided with teeth, the problems sometimes associated with the provision of teeth, for example, difficulty in machining and deformation of the teeth during deformation e.g. mandrel expansion, will not always be significant. For example, some heat recoverable alloys are relatively easy to machine and, in certain applications, some deformation of the teeth during deformation will not be serious. Furthermore, the provision of such teeth will sometimes be positively advantageous. Accordingly, it should be made clear that the present invention also includes devices in which the heat recoverable member is provided with means e.g. teeth on one or both of its principal surfaces and is not limited to smooth-surfaced recoverable drivers.

In the preferred tubular devices of the present invention the length of the sleeve can be greater than, equal to or less than the length L of the heat recoverable, e.g. heat shrinkable, member. Preferably, however, the sleeve protrudes from each end of the heat recoverable member so as to afford strain relief adjacent the opposite ends of the recovered member. In such a case the length of the sleeve is preferably not greater than about $L+2D_i$, or $L+2D_e$, where $D_i$ is the internal diameter of the heat-shrinkable member and $D_e$ is the external diameter of the heat-expansible member, and is more preferably not greater than about $L+D_i$ or $L+D_e$.

It will be appreciated that the sleeve, e.g. the insert, of the device is preferably metallic. However, other materials having metal like properties and which are strictly speaking non-metallic, such as graphite, graphite and glass composite may also be used in certain applications. Suitable materials are well known and can easily be selected by those skilled in the art.

In the preferred use of the composite devices of the present invention in effecting joints between adjoining lengths of hydraulic or other tubing formed, for example, from stainless steel, titanium or aluminum, the sleeve is preferably made from a metal comprising a major proportion of titanium. Titanium inserts are especially preferred when the substrate is made from stainless steel, e.g. 21-6-9(21% chromium, 6% nickel, 9% manganese) stainless steel. When the substrate is made from a highly gall-prone metal the insert sleeve can be made from a less gall-prone metal which, when brought into contact with the substrate will result in galling. For example, when the substrate is titanium the insert may be stainless steel.

The preferred metals for use in the heat recoverable member include equiatomic titanium-nickel alloys and, especially, the substituted ternary alloys described in U.S. Pat. Nos. 3,759,552 and 3,753,700.

Those skilled in the art will readily be able to select suitable dimensions for the coupling devices according to the present invention. However, by way of illustration, the relevant dimensions of an especially preferred heat shrinkable coupling which can be used in adjoining ¼ inch nominal O.D. tubing are given in the table below:

| Parameter | Dimension (inch) |
| --- | --- |
| heat shrinkable sleeve length | 1.75 |
| heat shrinkable sleeve outer diameter | .75 |
| insert sleeve length | 2.00 |
| insert sleeve internal diameter | .508 |
| insert sleeve wall thickness | .036 |
| insert sleeve outer diameter | .580 |
| heat shrinkable sleeve inner diameter | .534 |

It will be appreciated that the present invention substantially solves all the disadvantages of the heat recoverable metal coupling devices previously employed. The interposition of the sleeve between the heat recoverable member and a substrate about which it is ultimately recovered prevents substrate contamination by various residues such as lubricants which are sometimes present on the interior surface of a compression coupling member and admits the pairing of insert sleeve and substrate materials for compatibility from mechanical, and chemical standpoints such as corrosion, thermal expansion, creep resistance, sealability, elastic modulus, flexural characteristics and high temperature strength. Any teeth that are provided in the coupling devices may be formed on the insert sleeve and because of this they are not exposed to the damaging forces involved in mandrel expansion. Because the heat recoverable member need have no teeth the manner in which it is expanded can be simplified, e.g. by bead or ball expansion as opposed to mandrel expansion. Additionally, in place of the tapered ends previously provided on monolithic compression sleeves for strain relief, the insert sleeves of the present invention may be made to protrude from the opposite ends of the compression sleeve by a sufficient amount to impart appreciable strain relief to the joints formed on recovery. This again simplifies the manufacture of the compression sleeves which can accordingly be formed from smaller machine blanks with consequent saving of expensive metal. Furthermore the insert sleeve act to insulate the chilled compression sleeves from warm substrates for a time sufficient to avoid premature recovery so that it is no longer necessary to resort to the chilling tools and other techniques previously used.

It will also be appreciated that, whilst the foregoing description has emphasised devices comprising a heat recoverable tubular sleeve having an internal insert sleeve, the present invention is not limited to such structures. For example, the heat recoverable member, which in its broadest sense may be referred to as a "driver", i.e. a member which upon recovery drives the other member of the composite device in the direction of recovery, may be positioned internally of said other member so as to force it outwardly rather than inwardly. In such cases the driver may be solid as well as hollow.

Similarly, although the use of teeth is especially advantageous in many coupling devices according to the present invention, it must be stressed that by forming the insert sleeve from a gall-prone material the ability of joints formed to resist tensile stresses can be markedly enhanced. Indeed, in particular cases, it has been found that resistance to tensile stress is greater where gall-prone inserts having uniform surfaces have been employed than where inserts are provided with a plurality of circumferential teeth which bite into or otherwise deform the substrates.

In addition, apart from the uses of the devices of the present invention in joining cylindrical substrates, as described in some detail above, they may be used to plug holes, either from an internal or an outward direction, to plug the ends of tubular conduits, either by means of a cap type structure which has one solid end and one open end or by means of a solid plug which expands outwards, and as rivets. One suitable way of making a rivet in accordance with the present invention would be to hollow out the stem of a conventional rivet and to place within it a driver capable of expansion upon heating. In such an application, at least the stem of the rivet will desirably be fabricated from a gall-prone material.

Referring now to FIG. 1, an expansible cylindrical sleeve blank 10 rests on a collar support 11, which is in turn replaceably supported in an annular recess in a platform 12. Frame members 13 suspend this assembly in a suitable cryogenic fluid 14 such as liquid nitrogen so that sleeve blank 10 is entirely immersed therein. A tapered expansion mandrel 15 is disposed within part 10 so as to position the upper portion or ramp 16 of the mandrel 15 above the blank. The leading end of a pusher rod 17 is received in a recess 18 in the rear end of mandrel 15, the rear end of rod 17 being detachably mounted on the forward end 19 of a hydraulically powered ram. Upon ram activation, mandrel 15 is forced downwardly by the axial force imposed thereon by rod 17, expanding sleeve blank 10 to an internal diameter equal to the greatest transverse dimension of mandrel 15. In the course of the progressive expansion of blank 10 by mandrel 15, those portions of the expanded blank 10 past which the mandrel has travelled tend to spring back to a slight degree sufficient to engage the exterior surface of an insert member 20 which is carried by rod 17 into the sleeve blank 10. Typically, the greatest transverse dimension of the mandrel is from 6% to 9% greater than the unexpanded inner diameter of the sleeve blank 10. Following expansion, the retained diametral increase is commonly of the order of from 5 to 7%. For example, in the case of an unexpanded sleeve blank having an internal diameter of 0.534 inch expanded with a mandrel whose greatest transverse dimension is 0.593 inch, the expanded compression sleeve may spring back 0.013 inch once the mandrel has passed through the expanded blank, engaging an insert having an outer diameter 0.580 in a snug, push fit.

Pusher rod 17 is sized to drop through the insert-supplied compression sleeve once mandrel 15 has passed therethrough.

Of course, other means of supplying the insert to the expanded compression sleeve will be apparent to those skilled in the art. For example, the insert can simply be manually supplied to the sleeve just prior to or in the course of substrate joinder with the coupling.

FIG. 2a depicts the composite coupling arising from an expansion-assembly procedure as described with reference to FIG. 1 positioned about the adjacent ends of end-to-end aligned tubular substrates 21 and 22, while FIG. 2b illustrates the assembly resulting from recovery of the composite of FIG. 2a about the so-aligned substrates. Preferably, as in the case of each of the compression sleeves depicted in the drawings, the surface of heat recoverable sleeve which contacts the insert is generally uniform, i.e. essentially devoid of discontinuous design features such as teeth. In the case of FIG. 2, the exterior principal surface of insert 20 is generally uniform while the interior principal surface bears plural, spaced apart teeth 23 bounding the interior mid-section of the coupling 20. The wall thickness of the body portion of insert 20 from which the teeth 23 depend is preferably thinner than the wall thickness of compression sleeve 10 and is most preferably as thin as possible for maximum transmission of recovery forces. As appears from FIG. 2b, recovery of sleeve 10 causes teeth 23 to deform substrates 21 and 22, enhancing the resistance of the formed joint to tensile stress.

As those skilled in the art will realize, not every configuration of circumferential tooth is suited to formation of a gas-tight seal in the practice of this invention. However, generally squared teeth such as those depicted as formed on the interior surface of insert 20 in FIG. 2a may usefully be employed in increasing resistance to gas leakage. However, more knife-edged teeth are generally superior in this regard.

FIGS. 3a and 3b depict a further composite coupling formed according to the present invention prior to and following its heat recovery about the adjacent ends of end-aligned tubular substrates 24 and 25. Of the two principal surfaces of insert 26, the interior surface is generally uniform, while the exterior surface bears plural radical teeth 27 which may or may not be circumferentially formed about the entirety of the insert. As appears from FIG. 3b, recovery of the compression sleeve occasions contiguous wave form generation in the insert and substrate tubing, resulting again in enhanced resistance in the formed joint to tensile stress.

In the case of each of the composite couplings of FIGS. 2 and 3 wherein a principal surface of the insert is generally uniform, advantage may be derived by ensuring that the insert is formed of a gall-prone metal.

Figure 4A:
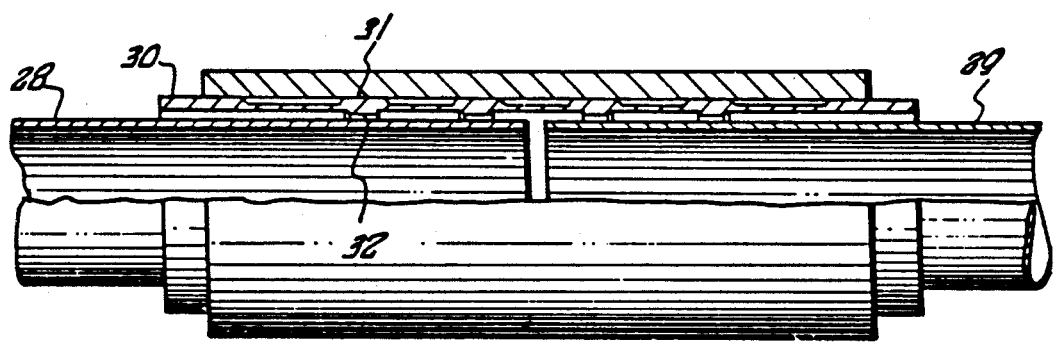
FIG. 4a shows, in cross-section, a third form of coupling device according to the present invention positioned about the aligned ends of two pipes.
Figure 4B:
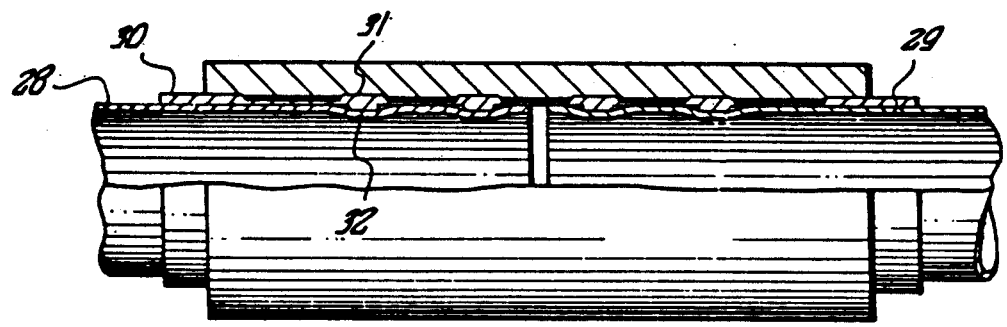
FIG. 4b shows the coupling device of FIG. 4a after recovery.

FIGS. 4a and 4b depict a further composite coupling formed according to the present invention, before and after its recovery about the adjacent ends of end-aligned tubular substrates 28 and 29. In FIG. 4a, both the interior and exterior principal surfaces of the insert are generally uniform; advantage may be derived by ensuring that the insert is formed of a gall-prone metal.

FIGS. 4a and 4b depict a further composite coupling formed according to the present invention, before and after its recovery about the adjacent ends of end-aligned tubular substrates 28 and 29. In FIG. 4a, both the interior and exterior principal surfaces of insert 30 bear radial (preferably circumferential) teeth. Preferably, for maximum transmission of recovery of forces to the substrate, individual ones of pairs of the teeth on insert 30 respectively protrude inwardly and outwardly from the body of the insert at points equidistant from its mid-section. See, for example, the teeth of pair 31-32 in FIG. 4a. FIG. 4b depicts the joint formed upon recovery of the composite coupling of FIG. 4a.

Figure 5:
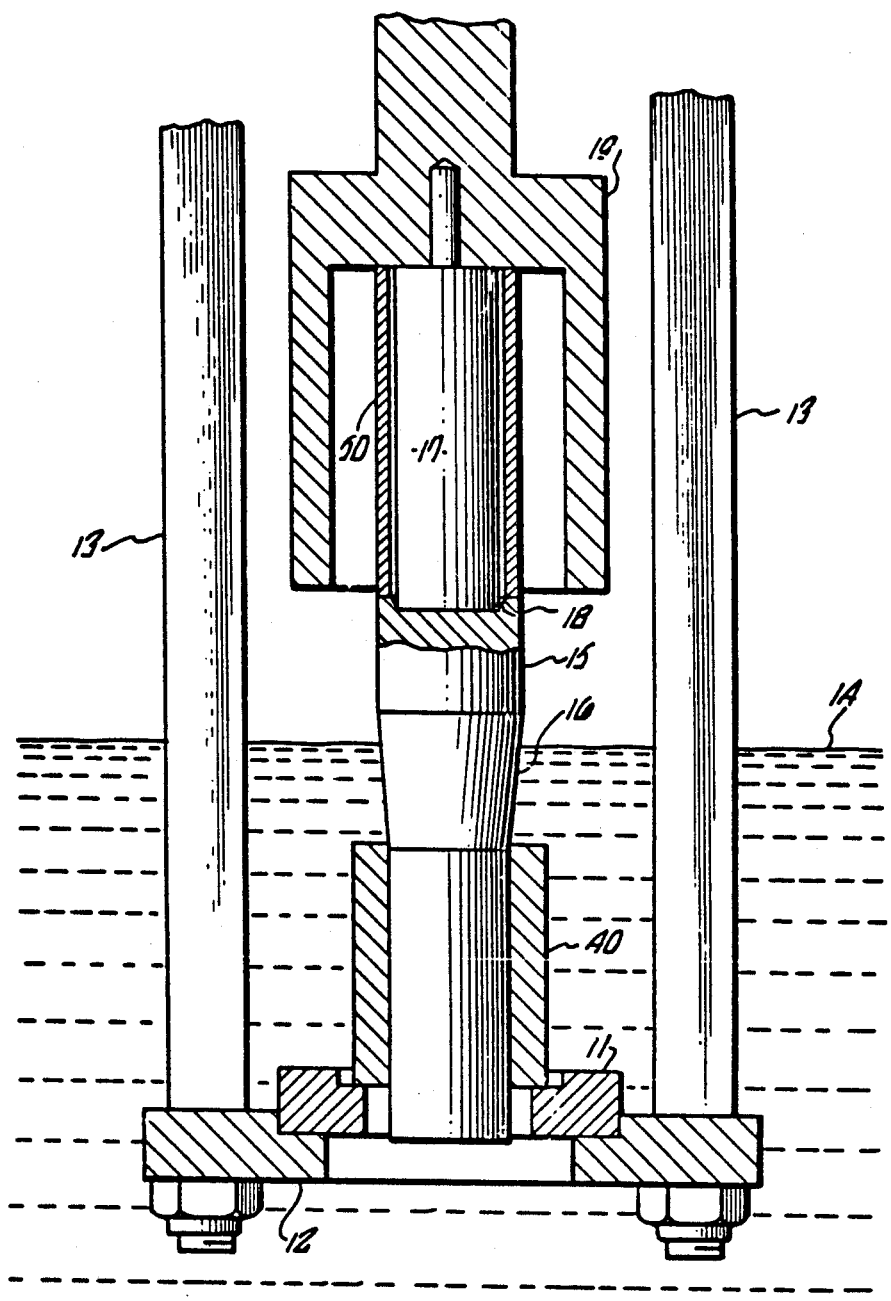
FIG. 5 is a view, partly in section, showing one manner for making a coupling device according to the present invention in which the insert is a simple gall-prone tube.

FIG. 5 shows a manner of making a composite coupling device similar to that shown in FIG. 1, except that the heat-shrinkable sleeve is formed from a blank 40 and the insert sleeve 50 is made from a gall-prone metal. The method of procedure and the relevant dimensions are otherwise as described with reference to FIG. 1.

FIG. 6a depicts the composite coupling arising from an expansion-assembly procedure like that depicted in FIG. 5 positioned about the adjacent ends of end-to-end aligned tubular substrates 51 and 52, while FIG. 6b illustrates the assembly resulting from recovery of the composite of FIG. 6b about the so-aligned substrates. In the case of the assembly of FIG. 6a, formation of insert 50 from a gall-prone metal enhances resistance of the formed joint to tensile stress and additionally assists in tensile load transfer through recovered sleeve 40. That surface of the heat recoverable sleeve which contacts the insert is preferably generally uniform i.e. essentially devoid of discontinuous design features such as teeth, etc. For optimal attainment of the advantage conferred by the use of gall-prone inserts, the surface roughness of the insert is desirably made like that of one or more of the surfaces it adjoins in the particular application. For example, for the hydraulic conduitry for which the composite couplings are preferably employed, the generally uniform surface of the insert preferably exhibits profilometer roughness not greater than about 63 micro-inches.

In applications in which a gas-tight joint is specified, the insert preferably bears on its interior surface means for effecting a gas-tight seal between the exterior environment and the interior of the recovered, composite coupling. In FIG. 7a, compression sleeve 53 is supplied with an insert 54 having a mid-section 55 bounded by spaced apart circumferential teeth 56 and 57, which are configured to effect a gas-tight seal following recovery about a substrate. Thus, in FIG. 7b, recovered sleeve 53 is shown as having, in the course of recovery, to have caused teeth 56 and 57 to, in effect, incise the tubular substrates 58 and 59. Appropriately configured teeth, by deforming the substrate, by themselves deforming during recovery, or by a combination of both can be employed to ensure gas-tightness of the completed joint. Of course, alternative methods may serve as well. For example, a portion of the insert on either side of the interior mid-section thereof may bear a ring of a deformable material such as annealed aluminium or copper, be coated with, e.g. a fluorocarbon or other polymeric material, be plated with a readily deformable metal or otherwise be provided with means for effecting a gas-tight seal upon recovery.

The foregoing description has emphasized devices wherein the insert has one or more teeth on one or both of its principal surfaces in order to improve the properties of the heat recovered article or devices on which the insert sleeve is made from a gall-prone metal.

The following FIGS. 8a to 13b illustrate how advantages can be obtained by forming the insert with a weakened wall section. The weakening facilitates selective collapse of the insert upon heat recovery of the compression sleeve with a concomitant selective regulation of the compressive forces transmitted to the substrate.

FIGS. 8a and 8b depict a further composite coupling formed according to this invention, respectively before and after its recovery about the adjacent ends of end-aligned tubular substrates 63 and 64. Of the two principal surfaces of insert 65, the interior surface is generally uniform, while the exterior surface has a uniform taper from a maximum wall thickness at about its mid-point 66 giving it an hourglass configuration. As appears from FIG. 8b, recovery of the compression sleeve occasions a deformation of the insert so that it exerts greater compressive forces on the substrate at a point near the end of the insert than at its mid-point. This differential causes the insert and substrate to deform as shown in FIG. 8b resulting in enhanced resistance in the formed joint to tensile stress.

FIGS. 9a and 9b depict a somewhat similar further composite coupling formed according to this invention wherein the heat recoverable member or driver is positioned internally of the other member. In FIG. 9a, the end-aligned substrates, are positioned about tubular member 69 which itself is positioned around heat recoverable member 70. Of the two principal surfaces of tubular member 69, the exterior surface is generally uniform, while the interior surface tapers uniformly from a maximum wall thickness at points at or near its ends to a minimum wall thickness at about its mid-point 71. Upon heat recovery of member 70, deformation of the insert and the substrate occurs as shown in 9b resulting in enhanced resistance in the formed joint to tensile stress. Coupling devices of this type are particularly useful when it is desired to couple substrates where an exterior coupling would not be useable because of the spare requirements of the environment of the coupling. Heat recoverable member 70 is shown as a solid rod. However, a tubular driver can be used where necessary to provide a pathway for fluids.

Inserts of this invention with a weakened wall section are also obtained by forming the insert with one or more slots or elongate flats. A flat is an area in the exterior surface of the insert where the wall thickness has been locally reduced. Preferably the slots and flats are disposed parallel to the longitudinal axis of the insert. Normally, at least one pair of slots or flats are employed in an arrangement whereby relatively uniform deformation of the insert about its circumference occurs, for example by symmetrical arrangement.

Figure 9C:
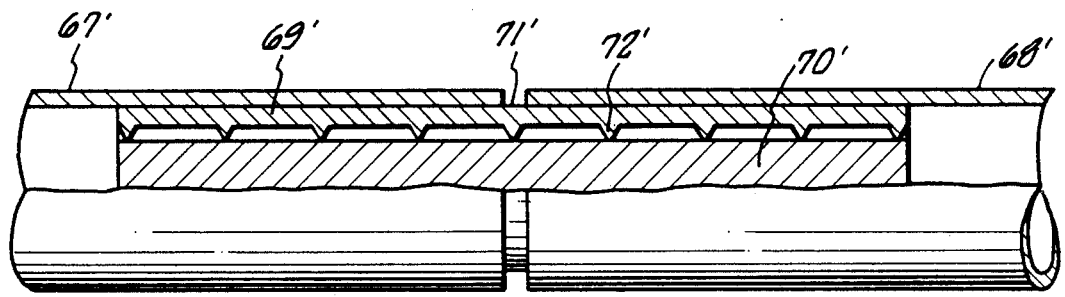
FIG. 9c shows a version of the heat-expandable device of FIG. 9a positioned within the aligned ends of two pipes.

FIG. 9c shows a composite coupling formed according to this invention similar to that shown in FIGS. 9a and 9b. In FIG. 9c, end-aligned substrates 67' and 68' are positioned about a tubular member 69' which itself is positioned around heat-recoverable member 70'. Of the two principal surfaces of tubular member 69', the exterior surface is generally uniform, while the interior surface has a plurality of teeth 72'.

Referring now to FIG. 10, there is shown in perspective tubular insert 72 for a composite coupling formed according to this invention. Insert 72 has weakened wall sections formed by a pair of slots 73 whose long dimension is parallel to the longitudinal axis of the insert. The mid-point of the slots corresponds to the mid-point of the insert, their ends being equidistant from the ends of the insert.

FIG. 11a is a perspective of a tubular insert 74, similar to that of FIG. 10. However, in insert 74 the weakened wall sections are formed by a pair of elongate flats 75 parallel to the longitudinal axis of the insert.

FIG. 11b depicts a cross-section of a composite coupling employing the insert of FIG. 11 after its recovery about the adjacent ends of end-aligned tubular substrates 76 and 77. The extent of deformation is exaggerated for purposes of illustration. As appears from FIG. 11b, weakening the insert by means of the flats results in greater deformation at the center of the coupling than would normally occur. This improves the interfacial pressure between the insert and the substrate thereby improving the pressure integrity of the coupling. A coupling employing the insert of FIG. 10 would have, if shown, a cross-section similar to that of FIG. 11b.

FIG. 12 is a perspective of another tubular insert 78 useful in the composite couplings of this invention. Insert 78 has weakened wall sections formed by two pairs of slots 79 disposed on either side of a nonweakened mid-section 80.

The insert 81 of FIG. 13a is similar to that of FIG. 12 except that the weakened wall sections are two pairs of elongate flats 82 disposed about the non-weakened mid-section 83.

FIG. 13b depicts a cross-section of a composite coupling employing the insert of FIG. 13a after its recovery about the adjacent ends of end-aligned tubular substrates 84 and 85. The extent of deformation is exaggerated for purposes of illustration. As appears from FIG. 13b weakening the insert by means of the flats results in greater deformation of the insert and substrates at points intermediate the ends of the insert and its non-weakened mid-section. This deformation enhances the resistance of the formed joint to tensile stress.

Although the principal surfaces of the inserts of FIGS. 10-13 are shown as being generally uniform, either or both surfaces can be provided with teeth as hereinbefore discussed. Preferably, the inserts are provided with a plurality of teeth on either side of the mid-section. Most preferably, the teeth are located on the inside surface of the inserts. The use of teeth further improves the resistance of the recovered coupling to tensile stress. Alternatively, or in addition, the inserts could be made from a gall-prone material as described above.

It will be apparent to those skilled in the art that the extent to which the insert is weakened determines the extent of its deformation when compressed upon heat recovery of the compression sleeve. In the case of the slots, the extent of weakening is determined by the number, length and width of the slots. In the case of flats, the number, length and width of the flats as well as their depth determines the extent of weakening.

While the foregoing description has emphasized devices comprising a heat recoverable tubular sleeve having an internal insert, it is to be understood that the present invention is not limited to such structures. For example, the recoverable driver may be positioned internally of the other member, such that expansive recovery of the driver will force the other member outwardly rather than inwardly, In such cases, the driver may be solid as well as a tubular sleeve.

A driver capable of expansive recovery is conveniently obtained by drawing, by method's well known to the art, a solid or hollow rod, of the desired heat-stable diameter, while in its martensitic state to the desired heat-recoverable diameter. Upon warming to a temperature in which it exists in its austenitic state, the rod contracts in length with an expansion in diameter.

One example of such an application of the present invention is a rivet such as that shown in cross-section in FIG. 14a. Rivet 86 as shown has a hollow stem 87 forming a tubular section 88 for a heat recoverable drivers 89. Preferably the hollow portion of the stem has a diameter at the cap end greater than the diameter at its opening, the diameter at the opening being such that the driver is easily inserted. FIG. 14b is a cross-section view of the rivet of FIG. 14a after heat recovery. A rivet of this type is particularly useful in those applications where blind rivets are employed.

The following figures illustrate various forms of the present invention in which the insert sleeve is provided with a combination of features such as those described above.

In FIG. 15a the insert sleeve 90 is provided with longitudinal terminal slots 91 on either side of its mid-section 92 and is also provided with internal teeth 93 for enhancing the contact made by the insert sleeve with a substrate. As can be seen from FIG. 15b the teeth 93 extend beyond the length equal to that of the slots 91. In the mid-section 92 of the sleeve continuous teeth are provided for sealing purposes. Such an insert sleeve can, for example, advantageously be made from a copper-nickel alloy.

FIG. 16 shows a similar sleeve 94 which is provided with a plurality of slots 95 on either side of its mid-section. In this case, however, the slots do not extend to the ends of the sleeve. As in FIG. 15b, the sleeve can be provided with a plurality of teeth in the vicinity of the slots. Such a sleeve can be made, for example, from a copper-nickel alloy.

The following figures illustrate the provision of further auxiliary inserts. In FIG. 17a there is shown a sleeve 100 which is provided with slots 101 in a manner similar to that in the sleeves of FIGS. 15a and 16. However, in this case the sleeve is not itself provided with internal teeth. Instead, there is provided an auxiliary insert member 103 as shown in FIG. 17b. FIG. 17c shows, in cross-section, the internal configuration of the insert 103. The auxiliary insert 103 can be pushed into the insert sleeve 100. As an alternative to the provision of auxiliary member 103 the sleeve 100 may be provided with a series of ring segments the internal surfaces of which may be toothed or plain. These can be inserted into the insert sleeve 100 by pushing them in from one or both ends. Alternatively, they may be inserted through the slots 101 and then maneuvered into position. For this purpose it may be advantageous to enlarge one or more of the slots 101 e.g. as shown in slot 102 in FIG. 17a.

It will be appreciated that, in some instances, it may be possible to use the further auxiliary members such for example as member 103 and to omit the main insert sleeve e.g. sleeve 100.

It will also be appreciated that the nature of the materials used for the insert sleeve 100 and the further auxiliary members e.g. 103 can be chosen to ensure good compatability with the driver member and the substrate. In this manner, for example, tooth hardness and corrosion compatability may be made independant variables in the choice of design.

FIG. 18a shows a further form of insert sleeve 104 provided with four longitudinal slots 105 one of which is widened to provide an enlarged central portion 106. FIG. 18b shows a cross-section through this central portion and FIG. 18e shows a section through the length of insert sleeve 104 from which it will be seen that the sleeve is provided with teeth 107 on either side of its mid-section 108. In order to provide a good seal about, for example, two pipes abutting in the region of its mid-section a further auxiliary sealing ring 109 made, for example, from a copper-nickel alloy can be positioned within the mid-section 108 of the sleeve 104. This can be achieved by inserting the ring 109 through the enlarged portion 106 of one of the longitudinal slots 105 and then twisting the ring through 90° and maneuvering it into position. The mid-section 108 of the sleeve 104 may be internally recessed 110 to facilitate correct positioning of the ring 109. This is shown in FIG. 18d.

FIG. 19 shows yet a further form of insert sleeve 111 which is provided with four large longitudinal slots 112 so that, in effect, the insert sleeve forms a cage. The object of this cage is to provide a casing for auxiliary insert members. For example the sleeve 111 could be made from a soft material which is compatible with hydraulic fluids and which is capable of good contact with a heat recoverable metal driver. In this case it may be advantageous to insert a further auxiliary member 113 is provided with external teeth 114 to facilitate secure contact with the sleeve 111 and is also provided with a central annular lug 115 which can cooperate with grooves 116 in the sleeve 111 to facilitate correct positioning. The auxiliary member 113 can, of course, also be provided with internal teeth for contacting a substrate. Preferably the portion 115 is resilient so that it exerts a secure positioning pressure on the grooves 116.

Alternatively, in other applications it may be advantageous to make the sleeve 111 itself toothed (or gall-prone) and resilient in which case a central soft sealing ring such, for example, as ring 109 in FIG. 18c, may be positioned in the grooves 116 and held there by the spring forces of the segments of the sleeve 111.

It will be appreciated from the above discussion that, whilst certain specific insert sleeves and auxiliary members have been described, many other variations will be possible according to the particular application desired.

A typical application for the composite couplings described above is to join tubular cylindrical substrates. Properly dimensioned, these couplings can be employed to join substrates that vary greatly in size. For example, they might find application in joining tubing sections that could be used for hydraulic systems in aircraft. They can also be used to join sections of pipe of very large dimension.

Also as indicated above, the drivers associated with the composite couplings described in the aforementioned Martin applications are generally tubular members. Composite couplings employing them are limited by the amount of recoverable dimensioned change that can be imparted to the drivers which in the case of tubular drivers is on the order of 6-8%.

Therefore, the present invention also provides composite couplings in which the driver is capable of undergoing a high percentage of recovery when compared to composite couplings in which the driver-insert combination are simple tubular members.

One manner in which this is accomplished is to provide composite couplings in which the driver is of relatively large diameter when compared to that of the substrate. However, it is presently preferred to employ as drivers, members that can undergo large dimensional change in the process of being rendered heat recoverable by virtue of their being provided with structural characteristics that can undergo a bending deformation when compressive or tensioning forces are applied.

FIG. 21 illustrates a composite coupling according to the present invention in which a high percentage of recovery is obtained by employing as a driver heat-shrinkable member 117 which has a very large diameter relative to the substrate 118. Insert 119 is also of large diameter but is provided with a plurality of rib members 120 which transmit the recovery force to the substrate. Preferably, insert 110 is provided with slots 121 as shown in the FIG. 15a or otherwise weakened to facilitate its deformation as the driver undergoes recovery.

By reference to FIG. 21 it can readily be seen that as the diameter of the driver is increased relative to that of the substrate, the total amount of recovery that can potentially be exerted upon the substrate is increased. Thus, if the diameter of driver 117 in its recoverable form is, for example, 4 times that of an expanded driver exactly sized to receive the substrate its effective recovery is 24-32% (4 times 6-8%) rather than the usual 6-8%.

In FIGS. 22a-22g is illustrated a composite coupling in which the driver 122 is capable of a high percentage of recovery from an expanded form by being provided with a plurality of slots 123 at both ends which allow the ends to be expanded by bending the fingers 124 defined by those slots as shown in FIG. 22b. Center section 125 of the driver may also be expanded, for example by using a mandrel, the usual 6-8%.

An assembled composite coupling prior to recovery employing driver 122 is shown in FIG. 22c with cylindrical substrates 126 and 127 inserted in the aperture defined by slotted insert 128. As shown, insert 128 is provided with teeth to more securely engage the substrate. It may also be made of a metal that is gall-prone relative to the substrate. As previously indicated, the slots facilitate the insert's deformation upon recovery of the driver.

In the assembly shown in FIG. 22c, snap rings 129 are provided to assist in retaining the insert in the coupling prior to recovery and to transmit the recovery force at points intermediate the ends and center of the coupling. The recovered composite is shown in FIG. 22d. The constriction imparted to the substrate, exaggerated in FIG. 22d for illustrative purposes, increases the tensile strength of the joint.

A modification of driver 122 is shown in FIG. 22e in which the fingers 124 are provided with rounded interior surfaces 130 which perform a function similar to the snap rings of FIG. 22c and 22d. Assembled couplings before and after recovery employing modified driver 122 are shown in FIGS. 22f and 22g.

Another composite coupling capable of a high percentage of recovery is shown in FIG. 23 in which a tubular heat shrinkable driver 131 has been provided with a plurality of slits 132 that begin at one edge of the driver but terminate just short of the other edge in a pattern in which the edge that is slit is alternated. As can be seen from FIG. 23, upon expansion to impart heat recoverability, the tube is given a series of "z" shaped bends by virtue of angular deformation at the base of each slit. The slits allow the driver to expand more than the usual 6-8% by reason of the binding made of deformation.

In FIG. 23, an insert member 133 has been inserted in the driver. It will be appreciated that it can be provided with teeth and/or be made of a gall-prone metal. Also, it can be structurally weakened as by providing it with slots to facilitate its deformation.

A composite coupling similar to that of FIG. 23 is shown in FIGS. 24a-24b in which driver 134 is obtained by bending a metallic member, for example wire (preferably rectangular wire) to give it a series of generally "s" shaped convolutions. The convolutions are arranged in a manner such that when installed upon the insert 135, a line bisecting the angle defined by the convolutions lies generally parallel to the longitudinal axis of the coupling. When expanded, the bent configuration of the driver allows its expansion to exceed the usual 6-8% as it can bend to increase its diameter. A coupling employing two such drivers is illustrated in FIG. 24b.

Yet another composite coupling having a convoluted driver is shown in FIGS. 25a-25b. In that coupling, heat recoverable driver 136 is provided with convolutions perpendicular to the longitudinal axis of the coupling. It has the advantage of being conveniently made to almost any length by an extrusion process. Insert member 137 can be any of the usual structures employed in the composite couplings of this invention, i.e., it can have teeth or serrations or be gall-prone to improve engagement with the substrate and can be structurally weakened to facilitate deformation. A driver like member 136 can easily be compressed to a smaller diameter to allow it to radially expand upon recovery where such is useful. The percentage of recovery that can be exhibited by such drivers is increased by virtue of the fact that bending is allowed by the convolutions.

As shown in FIG. 25b, convoluted driver 136 can be provided with an unyielding cylindrical jacket 138 which has the effect of focussing more of the recovery force upon insert 137 and ultimately substrates 139 and 140.

FIG. 26 illustrates another composite coupling according to the present invention. In this coupling, the driver compreses a generally cylindrical member 141 that has been made by joining the ends of a springlike coil of metal wire. Preferably, a composite coupling employing such a driver utilizes them in pairs as shown. To facilitate their use, insert 142 is shown with a pair of channels 143 and 144 adapted to receive the coils. As shown in FIG. 26, the composite is used to join flanged substrates 145 and 146 although it can also be employed to couple simple tubular or other cylindrical sections.

The couplings described herein are but illustrative of the many formes the present invention may take. It will be apparent that the composite couplings of this invention are suited to many applications where the joining of hollow or solid cylindrical substrates is desired.

I claim:

1. A composite device for securely engaging at least one substrate which comprises:
   (a) at least one tubular, heat-recoverable, metallic compression sleeve; and
   (b) at least one tubular, metallic insert snugly and concentrically disposed within, adjacent to, and in contact with the compression sleeve so that when the compression sleeve is heat-recovered by being heated above its transition temperature, the insert is altered in at least one of its dimensions and is driven inwardly by the heat-recovered sleeve for securely engaging and forming a gas-tight seal with the substrate.

2. The device of claim 1 wherein the insert is formed of a gall-prone metal and both principal surfaces of the insert are generally uniform.

3. A composite device as claimed in claim 1 wherein the interior and exterior surfaces of the insert each bear at least one radial tooth circumferentially formed about the longitudinal axis of the insert, at least the tooth on the interior surface being continuous, wherein when the compression sleeve is heat-recovered by being heated above its transition temperature, the teeth remain on the respective surfaces and the insert is driven inwardly by the heat-recovered sleeve such that the tooth on the interior surface of the insert securely engages and forms a gas-tight seal with the substrate.

4. The device of claim 3 wherein both the interior and exterior surfaces of the insert bear a plurality of the teeth, at least the teeth on the interior surface being continuous, the teeth being separate and longitudinally spaced apart from each other.

5. A device according to claim 4 wherein both principal surfaces of said insert bear a plurality of teeth on either side of the mid-section thereof.

6. A device according to claim 5 wherein said teeth are arranged pairwise such that individual ones of pairs of said teeth respectively protrude inwardly and outwardly from the body of said insert at points equidistant from said mid-section.

7. The device according to claim 1 wherein said insert has a plurality of ribs extending from its inner surface to contact the substrate and transmit the forces caused by recovery of the compression sleeve.

8. A device according to claim 1 wherein the compression sleeve has a plurality of slots at either end radiating from a center section, said sleeve when in its recoverable configuration having a greater outside diameter at its ends than at its center section.

9. A device according to claim 1 wherein said compression sleeve has a plurality of slits that begin at one edge and terminate short of the other edge of the compression sleeve, said beginning edge alternating between adjacent slits.

10. A device according to claim 1 wherein said compression sleeve is convoluted, said convolutions being parallel to the longitudinal axis of the composite device.

11. A device according to claim 1 wherein the compression sleeve is convoluted, said convolutions being perpendicular to the longitudinal axis of the composite device.

12. A composite device for securely engaging at least one hollow tubular substrate which comprises:
 (a) at least one heat-recoverable metallic driver; and
 (b) at least one tubular metallic sleeve snugly and concentrically disposed adjacent to, in contact with, and surrounding the exterior surface of the driver so that when the driver is heat-recovered by being heated above its transition temperature, the sleeve is altered in at least one of its dimensions and is driven outwardly by the heat-recovered driver for securely engaging and forming a gas-tight seal with the substrate.

13. The device of claim 12 wherein both principal surfaces of the sleeve are generally uniform and the sleeve is formed of a gall-pone metal.

14. A composite device as claimed in claim 12 wherein
 the interior surface of the tubular sleeve bears at least one radial tooth circumferentially formed about the longitudinal axis of the sleeve and the exterior surface of the sleeve is generally uniform, and wherein when the driver is heat-recovered by being heated above its transition temperature, the tooth remains on the interior surface of the sleeve.

15. The device of claim 14 wherein the exterior surface of the sleeve has a profilometer roughness not greater than about 125 micro-inches.

16. A device according to claim 15 wherein the sleeve is formed of a metal comprising a major proportion of titanium and wherein the exterior surface of the sleeve exhibits profilometer roughness not greater than about 63 micro-inches.

17. The device of claim 12 wherein the sleeve has a weakened wall section.

18. The device of claim 12 in which the sleeve bears on it exterior surface at least one continuous radial tooth circumferentially formed about the longitudinal axis of the sleeve, wherein when the driver is heat-recovered the tooth remains on the exterior surface and securely engages and forms a gas-tight seal with the substrate.

19. The device of claim 18 in which the sleeve has a weakened wall section.

20. A method for forming a connection to a substrate comprising the steps of:
 (a) placing on the exterior of the substrate a composite device comprising (i) a tubular heat-recoverable metallic compression sleeve and (ii) a tubular metallic insert snugly and concentrically disposed within, adjacent to, and in contact with the compression sleeve; and
 (b) heat-recovering the compression sleeve by heating the compression sleeve to above its transition temperature for altering the insert in at least one of its dimensions and driving the insert inwardly for securely engaging and forming a gas-tight seal with the substrate.

21. The method of claim 20 wherein
 the composite device is placed on a pair of substrates
 the insert is driven inwardly for securely engaging and forming a gas-tight seal with both substrates.

22. The method of claim 21 wherein the interior surface of the tubular metallic insert bears at least two continuous radial teeth circumferentially formed about the longitudinal axis of the insert, the teeth being separate and longitudinally spaced apart from each other, wherein the step of heat-recovering the compression sleeve drives the teeth into the substrates for securely engaging and forming a gas-tight seal with both substrates.

23. The method of claim 20 wherein the interior surface of the tubular metallic insert bears at least one continuous radial tooth circumferentially formed about the longitudinal axis of the insert, wherein the step of heat-recovering the compression sleeve drives the tooth into the substrate for securely engaging and forming a gas-tight seal with the substrate.

24. A method for forming a connection to a hollow, tubular substrate which comprises the steps of:
 (a) placing inside the substrate a composite device comprising (i) a heat-recoverable, metallic driver and (ii) a tubular metallic sleeve snugly and concentrically disposed adjacent to, in contact with, and surrounding the exterior surface of the driver; and
 (b) heat-recovering the driver by heating the driver to a temperature above its transition temperature for altering the sleeve in at least one of its dimensions and driving the sleeve outwardly for securely engaging and forming a gas-tight seal with the substrate.

25. A method as claimed in claim 24 wherein the composite device is placed inside a pair of substrates, and the step of
 heat-recovering the driver comprises driving the sleeve outwardly for securely engaging and forming a gas-tight seal with both substrates.

26. The method of claim 25 wherein the exterior surface of the tubular metallic sleeve bears at least two continuous radial teeth circumferentially formed about the longitudinal axis of the insert, the teeth being separate and longitudinally spaced apart from each other, wherein the step of heat-recovering the driver drives the teeth into the substrates for securely engaging and forming a gas-tight seal with both substrates.

27. The method of claim 24 wherein the exterior surface of the tubular metallic sleeve bears at least one continuous radial tooth circumferentially formed about the longitudinal axis of the insert, wherein the step of heat-recovering the driver drives the tooth into the substrate for securely engaging and forming a gas-tight seal with the substrate.

28. A composite device for securely engaging at least one substrate which comprises:
 (a) a tubular, heat-recoverable, metallic compression sleeve; and (b) a tubular, metallic insert, the interior surface of the insert bearing at least one continuous tooth circumferentially formed about the longitudinal axis of the insert, the exterior surface of the insert being generally uniform, the insert being snugly and concentrically disposed within, adjacent to, and in contact with the compression sleeve, wherein when the compression sleeve is heat-recovered by being heated above its transition temperature, the tooth remains on the interior surface of the insert and the insert is altered in at least one of its dimensions and is driven by the heat-recovered sleeve such that the tooth securely engages and forms a gas-tight seal with the substrate.

29. The device of claim 26 wherein the interior surface of the insert bears a plurality of such teeth, the teeth being separate and longitudinally spaced apart from each other.

30. A device according to claim 29 wherein the teeth are arranged pairwise such that individual ones of pairs of the teeth protrude inwardly from the body of the insert at points equidistant from the mid-section.

31. The device of claim 1 or 28 wherein the insert has a weakened wall section.

32. The device of claim 31 wherein the insert has at least one pair of weakened sections that are slots.

33. The device of claim 31 wherein the insert has at least one pair of weakened sections that are flats on the exterior surface of the insert.

34. A composite coupling for securely joining substrates which comprise:
(a) a plurality of tubular, heat-recoverable, metallic compression sleeves; and
(b) a hollow metallic insert snugly and concentrically disposed within, adjacent to, and in contact with the compression sleeves so that when each compression sleeve is heat-recovered by being heated above its transition temperature, the insert is altered in at least one of its dimensions and is driven inwardly by the heat-recovered sleeve for securely engaging and forming a gas tight seal with at least one of the substrates.

35. The coupling of claim 34 where a compression sleeve is disposed near each end of the insert.

36. The coupling of claim 34 wherein the interior surface of the insert bears at least one continuous tooth circumferentially formed about the longitudinal axis of the insert and the tooth remains on the interior surface of the insert when the insert is driven inwardly such that the tooth securely engages and forms a gas-tight seal with at least one of the substrates.

37. The coupling of claim 36 wherein the interior surface of the insert bears a plurality of such teeth, the teeth being separate and longitudinally spaced-apart from each other.

38. A composite device for securely engaging at least one substrate which comprises:
(a) a tubular heat-recoverable, metallic compression sleeve; and
(b) a plurality of tubular metallic inserts snugly and concentrically disposed within, adjacent to, and in contact with the compression sleeve so that when the compression sleeve is heat-recovered by being heated above its transition temperature, each insert is altered in at least one of its dimensions and is driven inwardly by the sleeve for securely engaging and forming a gas tight seal with the substrate.

39. A composite device for securely engaging at least one tubular substrate which comprises:
(a) an external, hollow, heat-recoverable, metallic compression driver;
(b) a tubular metallic insert sleeve snugly and concentrically disposed within, adjacent to and in contact with the compression driver; and
(c) at least one insert member concentrically disposed within, adjacent to, and in contact with the insert sleeve, the insert member being shorter than the insert sleeve;
wherein the compression driver is heat-recovered by being heated above its transition temperature, the insert sleeve is altered in at least one of its dimensions and is driven inwardly by the heat-recovered sleeve for securely engaging and forming a gas-tight seal with the substrate by driving the insert member into the substrate.

40. The device of claim 39 comprising a plurality of insert members spaced apart from each other.

41. The device of claim 40 in which the insert members are toothed.

42. The device of claim 41 in which the insert sleeve has a generally smooth, corrosion resistant internal surface.

43. A composite device for securely engaging a hollow tubular substrate which comprises:
(a) a heat-recoverable, metallic driver;
(b) a tubular metallic intermediate sleeve concentrically disposed adjacent to, in contact with, and surrounding the exterior surface of the driver; and
(c) at least one exterior sleeve concentrically disposed adjacent to, in contact with, and surrounding the exterior surface of the intermediate sleeve, the exterior sleeve being shorter than the intermediate sleeve;
wherein when the driver is heat-recovered by being heated above its transition temperature, the intermediate sleeve is altered in at least one of its dimensions and is driven outwardly by the heat-recovered driver for securely engaging and forming a gas tight seal with the substrate by driving the exterior sleeve into the substrate.

44. An assembly comprising:
(a) a pair of substrates;
(b) at least one tubular, metallic compression sleeve that has been heat-recovered by being heated above its transition temperature; and
(c) at least one tubular, metallic insert snugly and concentrically disposed within, adjacent to, and in contact with the interior surface of the compression sleeve and in contact with the exterior surface of both substrates, wherein when the compression sleeve was heat-recovered by being heated above its transition temperature, the insert was altered in at least one of its dimensions and was driven inwardly by the heat-recovered sleeve for securely engaging and forming a gas-tight seal with both substrates.

45. The assembly of claim 44 wherein the insert is formed of a gall-prone metal and both principal surfaces of the insert are essentially devoid of discontinuous design features such as teeth.

46. The assembly of claim 44 wherein both the interior and exterior surfaces of the insert each bears at least two radial teeth circumferentially formed about the longitudinal axis of the insert, at least the teeth on the interior surface of the insert being continuous, the teeth on each surface being separate and longitudinally spaced apart from each other, wherein when the compression sleeve was heat-recovered by being heated above its transition temperature, the insert was driven inwardly by the sleeve such that the teeth on the inner surface securely engaged and formed a gas-tight seal with both substrates.

47. The assembly of claim 46 wherein both the interior and exterior surfaces of the insert bear more than two of such teeth, the teeth being separate and longitudinally spaced apart from each other.

48. The assembly of claim 47 wherein both the interior and exterior surfaces of the insert bear a plurality of teeth on either side of the mid-section thereof.

49. The assembly of claim 46 wherein the teeth are arranged pairwise such that individual ones of pairs of said teeth respectively protrude inwardly and outwardly from the body of the insert at points equidistant from the midsection.

50. The assembly of claim 44 wherein the insert has a weakened wall section.

51. The invention of claim 2 or 44 wherein both principal surfaces of the insert exhibit a profilometer roughness not greater than about 125 micro-inches.

52. An assembly comprising:
    (a) a pair of hollow substrates;
    (b) at least one metallic driver that has been heat-recovered by being heated above its transition temperature; and
    (c) at least one tubular metallic sleeve snugly and concentrically disposed adjacent to, in contact with, and surrounding the exterior surface of the driver and in contact with the interior surface of both substrates, wherein when the driver was heat-recovered by being heated above its transition temperature, the sleeve was altered in at least one of its dimensions and was driven outwardly by the heat-recovered driver for securely engaging and forming a gas-tight seal with both substrates.

53. The assembly of claim 52 wherein both principal surfaces of the sleeve are essentially devoid of discontinuous design features such as teeth and the sleeve is formed of a gall-prone metal.

54. The invention of claim 13 or 53 wherein both principal surfaces of the sleeve exhibit profilometer roughness not greater than about 125 micro-inches.

55. The assembly of claim 52 wherein the sleeve has a weakened wall section.

56. The invention of claim 12 or 52 wherein the sleeve extends beyond the opposite ends of the driver and is not greater in length than about the quantity $L+2$ De, where L is the length of the sleeve and De is its external diameter.

57. The invention of claim 12 or 52 wherein the driver is a tubular sleeve.

58. The invention of claim 12 or 52 wherein the driver is a cylindrical rod.

59. As assembly comprising:
    (a) a pair of substrates;
    (b) a tubular metallic compression sleeve that has been heat-recovered by being heated above its transition temperature; and
    (c) a tubular, metallic insert, the interior surface of the insert bearing at least two continuous teeth circumferentially formed about the longitudinal axis of the insert, the teeth being separate and longitudinally spaced apart from ech other, the exterior surface of the insert being essentially devoid of discontinuous design features such as teeth, the insert being snugly and concentrically disposed within, adjacent to, and in contact with the interior surface of the compression sleeve and in contact with the exterior of both substrates, wherein when the compression sleeve was heat-recovered by being heated above its transition temperature, the insert was altered in at least one of its dimensions and was driven inwardly by the sleeve such that the teeth securely engaged and formed a gas-tight seal with both substrates.

60. The assembly of claim 59 wherein the interior surface of the insert bears more than two of such teeth, the teeth being separate and longitudinally spaced apart from each other.

61. The assembly of claim 60 wherein the teeth are arranged pairwise such that individual ones of pairs of the teeth protrude inwardly from the body of the insert at points equidistant from the mid-section.

62. The invention of claim 28 or 59 wherein the insert is formed of a gall-prone metal.

63. An assembly comprising:
    (a) a pair of substrates;
    (b) a tubular, metallic compression sleeve that has been heat-recovered by being heated above its transition temperature; and
    (c) a tubular, metallic insert, the exterior surface of the insert bearing at least one radial tooth circumferentially formed about the longitudinal axis of the insert, and the interior surface of the insert being essentially devoid of discontinuous design features such as teeth, the insert being snugly and concentrically disposed within, adjacent to, and in contact with the interior surface of the compression sleeve and in contact with the exterior surface of both substrates, wherein when the compression sleeve was hear-recovered by being heated above its transition temperature, the insert was altered in at least one of its dimensions and was driven inwardly by the heat-recovered sleeve for securely engaging and forming a gas-tight seal with both substrates.

64. The invention of claim 63 wherein the exterior surface of the insert bears a plurality of such teeth, the teeth being separate and longitudinally spaced-apart from each other.

65. The invention of claim 1, 28, 44, 59 or 63 wherein the insert protrudes from opposite ends of the sleeve and is not greater in length than about the quantity $L+2 Di$, where L is the length of the sleeve and Di is its internal diameters.

66. The invention of claim 65 wherein the insert is not greater in length than $L+Di$.

67. An assembly comprising:
    (a) a pair of hollow substrates;
    (b) a metallic driver that has been heat-recovered by being heated above its transition temperature; and
    (c) a tubular, metallic sleeve, the interior surface of the tubular sleeve bearing at least one radial tooth circumferentially formed about the longitudinal axis of the sleeve, the exterior surface of the sleeve being essentially devoid of discontinuous design features such as teeth, the sleeve being snugly and concentrically disposed adjacent to, in contact with, and surrounding the exterior surface of the driver and in contact with the interior surface of both substrates, wherein when the driver was heat-recovered by being heated above its transition temperature, the sleeve was altered in at least one of its dimensions and was driven outwardly by the heat-recovered driver for securely engaging and forming a gas-tight seal with both substrates.

68. The invention of claim 14 or 67 wherein the interior surface of the sleeve bears a plurality of such teeth, the teeth being separate and longitudinally spaced-apart from each other.

69. The assembly of claim 67 wherein the exterior surface of the sleeve has a profilometer roughness not greater than about 125 micro-inches.

* * * * *